(12) United States Patent
Seal et al.

(10) Patent No.: US 12,400,259 B1
(45) Date of Patent: Aug. 26, 2025

(54) SYSTEMS AND METHODS OF REPRESENTING AND EXECUTING GRID RULES AS DATA MODELS

(71) Applicant: Federal Home Loan Mortgage Corporation (Freddie Mac), McLean, VA (US)

(72) Inventors: Mark Seal, Viena, VA (US); James Quarterly, Centerville, VA (US); Suresh Kalkavery, Fairfax, VA (US); Li Chen, Fairfax, VA (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 0 days.

(21) Appl. No.: 17/166,915

(22) Filed: Feb. 3, 2021

(51) Int. Cl.
  *G06Q 40/00* (2023.01)
  *G06F 16/21* (2019.01)
  *G06F 16/22* (2019.01)
  *G06Q 40/03* (2023.01)

(52) U.S. Cl.
  CPC ........... *G06Q 40/03* (2023.01); *G06F 16/212* (2019.01); *G06F 16/2246* (2019.01)

(58) Field of Classification Search
  CPC .................................................. G06Q 40/025
  USPC ......................................................... 705/38
  See application file for complete search history.

(56) References Cited

U.S. PATENT DOCUMENTS

| 7,882,025 B1 * | 2/2011 | Seal ...................... G06Q 40/02 705/38 |
| 2010/0262534 A1 * | 10/2010 | Kaufman ............... G06Q 50/16 705/38 |
| 2013/0097093 A1 * | 4/2013 | Kolber ............... G06Q 10/1053 705/321 |

(Continued)

FOREIGN PATENT DOCUMENTS

WO  WO-2021071881 A1 *  4/2021  ............. G06F 9/541

OTHER PUBLICATIONS

Authors : Zhao Xinlong et al.: Research on the Construction and Trust Issue of Asset Securitization Multiple Initiators Underlying Asset Pool Model Based on Blockchain; IEEE XPLORE; Date of Conference: Jun. 11-13, 2021; (Year: 2021).*

(Continued)

*Primary Examiner* — Bruce I Ebersman
*Assistant Examiner* — Hatem M Ali
(74) *Attorney, Agent, or Firm* — Finnegan, Henderson, Farabow, Garrett & Dunner LLP

(57) ABSTRACT

Systems, methods, and computer program products are provided for establishing and enforcing approval thresholds. One or more processors may receive approval threshold data from a plurality of grids including attributes that define an approval threshold and generate a rule set based on the approval threshold data. An information grid is created comprising a plurality of cells and each cell contains a value representing data from the plurality of grids. A computer model is created to represent the rule set comprising a flat (Continued)

| MC Number | Risk Class | Note Rate | BuyUp per Remaining Maturity | | | BuyDown per Remaining Maturity | | |
|---|---|---|---|---|---|---|---|---|
| | | | 160-240 | 80-159 | 0-79 | 160-240 | 80-159 | 0-79 |
| m10001 | C1 | 0.000-4.624 | 2.8 | 1.8 | 1 | 4.5 | 3.5 | 2.7 |
| m10001 | C1 | 4.625-4.749 | 2.7 | 1.7 | 0.9 | 4.4 | 3.4 | 2.6 |
| m10001 | C1 | 4.750-4.874 | 2.6 | 1.6 | 0.8 | 4.3 | 3.3 | 2.5 |
| m10001 | C2 | 0.000-4.624 | 3 | 2.2 | 1.4 | 4.7 | 3.7 | 2.9 |
| m10001 | C2 | 4.625-4.749 | 2.9 | 2.1 | 1.3 | 4.6 | 3.6 | 2.8 |
| m10001 | C2 | 4.750-4.874 | 2.8 | 2 | 1.2 | 4.5 | 3.5 | 2.7 |
| m10001 | C3 | 0.000-4.624 | 3.2 | 2.4 | 1.6 | 4.9 | 3.9 | 3.1 |
| m10001 | C3 | 4.625-4.749 | 3.1 | 2.3 | 1.5 | 4.8 | 3.8 | 3 |
| m10001 | C3 | 4.750-4.874 | 3 | 2.2 | 1.4 | 4.7 | 3.7 | 2.9 | grid structure of fields storing the values and a tree node structure. A computer interface is associated with the model. A request for a change to update an element of the computer interface is received and the processor determines whether the requested change is within the approval threshold by evaluating the rule set. When the requested change is allowed by the rule set, the element is updated.

20 Claims, 18 Drawing Sheets

(56) References Cited

U.S. PATENT DOCUMENTS

2020/0334257 A1* 10/2020 Nicolaisen .......... G06F 16/9574

OTHER PUBLICATIONS

Authors: Arno Botha et al.: The loss optimization of loan recovery decision times using forecast cash flows: IEEE XPLORE: From: Conrad Beyers [view email] [v1] Mon, Oct. 12, 2020 11:12:39 UTC (549 KB) (Year: 2020).*
Authors : Zhao Xinlong et al: Research on the Construction and Trust Issue of Asset Securitization Multiple Initiators Underlying Asset Pool Model Based on Blockchain; IEEE XPLORE; Date of Conference: Jun. 11-13, 2021; (Year: 2021) (Year: 2021).*
Authors: Arno Botha et al: The loss optimization of loan recovery decision times using forecast cash flows: IEEE XPLORE: From: Conrad Beyers [view email] [v1] Mon, Oct. 12, 2020 11:12:39 UTC (549 KB) (Year: 2020) (Year: 2020).*

* cited by examiner

| MC Number | Risk Class | Note Rate | BuyUp per Remaining Maturity | | | BuyDown per Remaining Maturity | | |
|---|---|---|---|---|---|---|---|---|
| | | | 160-240 122 | 80-159 129 | 0-79 126 | 160-240 | 80-159 | 0-79 |
| m10001 | C1 | 0.000-4.624 | 2.8 142 | 1.8 | 1 | 4.5 152 | 3.5 154 | 2.7 156 |
| m10001 | C1 | 4.625-4.749 | 2.7 144 | 1.7 | 0.9 | 4.4 | 3.4 | 2.6 |
| m10001 | C1 | 4.750-4.874 | 2.6 146 | 1.6 | 0.8 | 4.3 | 3.3 | 2.5 |
| m10001 | C2 | 0.000-4.624 | 3 | 2.2 | 1.4 | 4.7 | 3.7 | 2.9 |
| m10001 | C2 | 4.625-4.749 | 2.9 | 2.1 | 1.3 | 4.6 | 3.6 | 2.8 |
| m10001 | C2 | 4.750-4.874 | 2.8 | 2 | 1.2 | 4.5 | 3.5 | 2.7 |
| m10001 | C3 | 0.000-4.624 | 3.2 | 2.4 | 1.6 | 4.9 | 3.9 | 3.1 |
| m10001 | C3 | 4.625-4.749 | 3.1 | 2.3 | 1.5 | 4.8 | 3.8 | 3 |
| m10001 | C3 | 4.750-4.874 | 3 | 2.2 | 1.4 | 4.7 | 3.7 | 2.9 |

FIG. 1

| Grid_Def Table (Defines an Information Grid) | | | |
|---|---|---|---|
| id_grid | The unique grid Id | | |
| name_grid | name of grid | | |
| grid_root | Reference to starting node of grid | | |
| id_version | id_version to allow for multiple versions | | |
| | | | |
| id_grid | name_grid | grid_root | id_version |
| 1885 | bubd | 10001 | 1 |

FIG. 4-A

| Grid_Schema (Meta Data to build Structure into tree) | | | |
|---|---|---|---|
| id_grid | The unique grid Id | | |
| level_order | The level in the grid graph structure | | |
| node_type | The type of node | | |
| id_version | id_version to allow for multiple versions | | |
| | | | |
| id_grid | level_order | node_type | id_version |
| 1885 | 1 | 45 | 1 |
| 1885 | 2 | 46 | 1 |
| 1885 | 3 | 47 | 1 |
| 1885 | 4 | 48 | 1 |
| 1885 | 5 | 49 | 1 |
| 1885 | 5 | 50 | 1 |

FIG. 4-B

| Node_Type (define a node e.g. master commitment) | | |
|---|---|---|
| nodeType | The Type of Node | |
| node_desc | The description or name of node | |
| datatype | Data type of node | |
| | | |
| nodeType | node_desc | datatype |
| 45 | masterCommitmentNumber | 100 |
| 46 | RiskClass | 100 |
| 47 | NoteRate | 101 |
| 48 | RemainingMaturity | 102 |
| 49 | buyup | 103 |
| 50 | buydown | 103 |

FIG. 4-C

| Data_Type (Meta data to build Structure and determine data type of node) | |
|---|---|
| datatype | Data type of node |
| name_data_type | primitive data type of node e.g., int, float string |
| operator_type | kind of operation that can be applied e.g. RI (range inclusive) |
| val_min | predefine minimum value of range if datatype is range |
| val_max | predefine maximum value of range if datatype is range |
| isRange | Flag to indicate whether this datatype represents a range |
| Bucket_order | The bucket's number for number of buckets/ranges defined |

| datatype | name_data_type | operator_type | val_min | val_max | isRange | bucket_order |
|---|---|---|---|---|---|---|
| 100 | String | | | | N | |
| 101 | double | RI | 0 | 4.624 | Y | 1 |
| 101 | double | RI | 4.625 | 4.749 | Y | 2 |
| 101 | double | RI | 4.75 | 4.874 | Y | 3 |
| 102 | double | RI | 160 | 240 | Y | 1 |
| 102 | double | RI | 80 | 159 | Y | 2 |
| 102 | double | RI | 0 | 79 | Y | 3 |
| 103 | double | | | | N | |

FIG. 4-D

| Grid_Node (Contains actual value of node and reference to parent) | |
|---|---|
| id_grid | The unique grid Id |
| id_node | Unique Id of node |
| node_type | The type of node |
| ValueNode | value of Node |
| parentNode | reference to parent node, null for root node |
| id_version | id_version to allow for multiple versions |

| id_grid | id_node | node_type | ValueNode | parentNode | id_version |
|---|---|---|---|---|---|
| 1885 | 10001 | 45 | mc123455 | | 1 |
| 1885 | 10002 | 46 | C1 | 10001 | 1 |
| 1885 | 10003 | 47 | 1 | 10002 | 1 |
| 1885 | 10004 | 48 | 1 | 10003 | 1 |
| 1885 | 10005 | 49 | 2.8 | 10004 | 1 |
| 1885 | 10006 | 50 | 4.5 | 10004 | 1 |

FreddieMac | Pricing Manager Application (PMA)    ⓘ Welcome back NP_FREDDIE_INT_UAT_MCSETUPALL ⏻ Logout Change Requests | Pricing | Resource Settings ▾ | User Settings ▾ | Operational Dashboard    Create New ▾

CREATE APPROVAL THRESHOLD

Status:    Active:    Yes

Threshold Set-Up    Threshold Summary

METADATA

Approval Threshold Name:   THRSH_C_(Credit Fee in Yield)_Fixe   801

Effective Date & Time:   803   🗓

Resource Type:   805   Fee Component (Master) ▾    Effective Upon Approval: ☐

Approval Threshold Description:   809    Resource Name:   807   C_(Credit Fee in Yield)_Fixed ▾

THRESHOLD GRID STRUCTURE

ADD ATTRIBUTE(S)

ADD METADATA

FIG. 8A

THRESHOLD GRID STRUCTURE

[ ADD ATTRIBUTE(S) ] — 811
[ ADD METADATA ] — 813

Criteria Structure

ATTRIBUTE NAME — GRID 1 ROWS: [1]

Product Type ☑

Assessment Period Duration (Days) ☑ Cutpoints: ○ Yes ⊙ No

Overall PT Volume Limit ☑ Cutpoints: ○ Yes ⊙ No

[ GENERATE ]

819  817

| ROW | PRODUCT TYPE | | ASSESSMENT PERIOD DURATION (DAYS) | | OVERALL PT VOLUME LIMIT ($) | | USER ROLE | ACTIONS |
|-----|--------------|--|-----------------------------------|--|------------------------------|--|-----------|---------|
|     | OPERATOR | ATTRIBUTE VALUE | OPERATOR | ATTRIBUTE VALUE | OPERATOR | ATTRIBUTE VALUE | VALUE | |
| 1 | IN ANY ▼ | 30-Year Fixed ▼ | >= ▼ | 60 | < ▼ | 400000000.00 | PRICING_GOVERNANC ▼ | ✦ 🗑 |
| 2 | Select ▼ | Select ▼ | Select ▼ | | Select ▼ | | Select ▼ | ✦ 🗑 |

[ ADD ATTRIBUTE(S) ]
[ ADD METADATA ]

815

THRESHOLD GRID STRUCTURE

Criteria Structure

[ GENERATE ]

821

[ CANCEL ]  [ SAVE AS DRAFT ]  [ ADD TO CR ]

FIG. 8B

CREATE Eligibility Group Rule Set

Status: [ ]　　Active: Yes

RuleSet Setup　　Eligibility Rules

SETUP

Effective Date & Time *: [ 1003 ]　　[ ] Effective Upon Approval *:

Expiration Date & Time: 12/31/9999 12:00:00 AM

Name *: 1001 — ERS...

Description: 1005

[ CANCEL ]　[ SAVE AS DRAFT ]　[ ADD TO CR ]　[ EXPORT ]

FIG. 10A

INSTANCE INFORMATION

Pricing Term Instance Name*: PT_ — 1201
1203

Description:

Assessment Data Type*: Select One... ▼
1205

Assessment Period From*: 1207
Overall Volume Limit 1211

Lower Tolerance Type: 1213 Select... ▼

Lower Tolerance: 1215

Mandatory: ☐

Effective Upon Approval*: ☑

Effective Date & Time:

Expiration Date & Time: 12/31/9999 12:00:00 AM
1209

Upper Tolerance Type: 1217 Select... ▼

Upper Tolerance: 1219

☐

INSTANCE GRIDLET

ADD ATTRIBUTE(S)

Criteria Structure

GENERATE

EXPORT

CANCEL  SAVE AS DRAFT  ADD TO CR

FIG. 12

SYSTEMS AND METHODS OF REPRESENTING AND EXECUTING GRID RULES AS DATA MODELS

TECHNICAL FIELD

The disclosed embodiments generally relate to representing and managing data and information from an information grid, and more particularly, to transforming information grids into data models for storing computer rule sets.

BACKGROUND

Many people that purchase a home borrow funds from a lender, such as a local bank, and grant the lender a security interest in the home, which serves as collateral. The loan taken out by the homebuyer is commonly known as a mortgage or mortgage loan. Each mortgage loan has many different attributes that characterize it by homebuyer characteristics, property characteristics, lender characteristics, loan product characteristics, and municipality characteristics, among others.

Lenders sell many of the mortgage loans that they originate into the secondary mortgage market. By purchasing mortgage loans, buyers in the secondary mortgage market provide lenders with capital to lend to subsequent homebuyers, allowing the lenders to meet consumer demand for additional home mortgages. In other words, the lenders lend to new homebuyers the money received from the sale of a mortgage in the secondary market. Thus, the secondary market for mortgage loans provides a new supply of money for housing, lowering the cost of money and ultimately lowering the cost of home ownership for consumers. The Federal Home Loan Mortgage Corporation (Freddie Mac), the Federal National Mortgage Association (Fannie Mae), and the Government National Mortgage Association (Ginnie Mae) are some of the major buying participants in the secondary mortgage market.

Secondary mortgage market buyers typically either purchase a home mortgage for cash, issue a security in exchange for a mortgage, or more commonly issue one or more securities for a group or pool of mortgages. In general, a mortgage pool is a positively identified group of mortgage assets combined for sale or some other purpose. The phrase mortgage assets generally refers to mortgages and/or mortgage-backed securities. A security that is exchanged for a mortgage loan(s) is often known as a mortgage-backed security (MBS). An MBS is typically a pass-through security representing an undivided beneficial interest in one or more pools of mortgage loans. An MBS is called a pass-through security because some percentage of the borrowers' payments of principal and interest are passed through to holders of interests in the MBS. An MBS may be backed by mortgage loans originated by one or more lenders.

Generally, mortgage asset purchasers determine the price they are willing to pay a seller for a mortgage asset based on the mortgage asset's attributes or characteristics, such as the risk associated with the mortgage asset (e.g., credit risk, prepayment risk, etc.), the note rate (such as an interest rate paid by the borrower), the remaining maturity (e.g., the number of months remaining before a mortgage is paid off by the borrower), the FICO score of the borrower, the geographical location of the property securing a mortgage, etc.

The total or net price of a mortgage asset is typically comprised to two or more price components. Price components are usually determined independently of each other because each is typically based on only the attribute(s) of the mortgage asset that affect each particular price component independent of the other price components. The price components combine to form the net price for a particular mortgage asset. For example, the net price of a mortgage asset may comprise a guarantee fee (Gfee) component, plus a seller adjustment amount component, minus a buy-down amount component (or plus a buy-up amount component).

Some price components for a mortgage loan may be based on the expected future value of MBSes that will be issued backed by the mortgage loan. For example, interest-only securities backed by mortgage loans that are not likely to be prepaid are more valuable than interest-only securities backed by mortgage loans that are likely to be prepaid, so a purchaser may be willing to pay more for not-likely-to-be-prepaid mortgage loans. Conversely, a purchaser who intends to issue interest-only securities may set a lower price when purchasing mortgage loans that are likely to be prepaid.

In sum, multiple attributes feed into each pricing component and multiple pricing components feed into net price. A logical way to organize these attributes and the value of the components is in an information grid format, or a lookup table. Lookup table organization of information is common in many areas that use two or more attributes to determine a desired value, not merely the mortgage asset pricing arena.

Mortgage asset purchasers may wish to quickly customize an offer price for a mortgage asset(s) for a particular customer or a particular situation. For example, a purchaser such as Freddie Mac may wish to give a special discount to a large bank for mortgages having certain characteristics that are immediately available. This makes an easily modifiable pricing mechanism desirable.

Mortgage asset purchasers may also wish to quickly modify the pricing mechanism to take advantage of new information. For example, a purchaser may identify a previously unrecognized correlation between a certain mortgage asset attribute and its expected behavior, such as a correlation between a certain risk class attribute of a mortgage loan and low prepayment speed of the mortgage. In such a case, the purchaser may increase the price it is willing pay for mortgages with the identified risk class attribute, knowing that certain securities backed by those mortgages will be more valuable because of the low prepayment speed. Conversely, mortgages lacking the identified risk class attribute may have their price lowered. This also illustrates the desirability of an easily modifiable pricing mechanism.

A typical secondary market purchaser may often have to analyze large amounts of data in order to determine the price of a large batch of mortgage loans in a short period of time. For example, a purchaser such as Freddie Mac may buy tens of thousands of mortgage loans at a time from a large bank and have to determine a total price for all mortgage loans overnight for settlement the next day. This makes a fast pricing mechanism desirable and emphasizes the need for quick and efficient access and storage of data in conjunction with such a mechanism.

Current systems typically use dedicated software applications (such as a custom pricing engine) and data models to determine the net price for a mortgage asset. Multiple applications using multiple data models to represent pricing grid information have been custom built for each problem. In traditional systems, in order for the pricing of a mortgage asset to take into account a new attribute, the pricing engine must be modified by changing the underlying software or instructions. Modifying software is time-consuming, cumbersome, and error prone. Thus, current systems are difficult to modify quickly or reliably. Moreover, customized modifications to mortgage pricing engines often results in inconsistent pricing for different, and similar, mortgage assets.

In addition, traditional systems use a grid-specific, tabular data model to hold the pricing information for mortgage assets and the rules for processing the data. The object model and database schema are custom tailored to each specific information grid format, as is the source code of applications using the data. Consequently, implementing a change to add a new attribute (including changing the information grid) typically requires changes to the database table to add new rows and columns, changes to the user interface application that maintain the database, new logic for the application(s) that access the database to compute pricing components, and new data conversion routines. It is difficult to implement this series of changes quickly and correctly.

SUMMARY

Disclosed embodiments include systems, methods, and computer program products for establishing and enforcing approval thresholds that include operations and components for receiving, by the at least one processor from the database, approval threshold data from a plurality of grids including attributes that define an approval threshold; generating, by the at least one processor, a rule set based on the approval threshold data; and creating, by accessing data in the database, one or more information grids comprising a plurality of cells, wherein each cell contains a value representing data from the plurality of grids and has a location in the one or more information grids. The operations and components may additionally include creating, with the at least one processor, a computer model to represent the rule set, the model comprising: a flat grid structure comprising a plurality of fields storing the values; and a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure. The operations and components may further include associating, using the at least one processor, a computer interface with the model; receiving, by the computer interface, a request for a change to update an element of the computer interface; determining, with the at least one processor, whether the requested change is within the approval threshold by evaluating the rule set; and responsive to a determination that the requested change is allowed by the rule set, updating the element.

Other embodiments consistent with the present disclosure include systems, methods, and computer program products for establishing and enforcing eligibility rule sets that include operations and components for receiving, by the at least one processor from the database, eligibility data from a plurality of grids including attributes that define an eligibility rule set and creating, by accessing data in the database, one or more information grids comprising a plurality of cells, wherein each cell contains a value representing data from the plurality of grids and has a location in the one or more information grids. The operations and components may additionally include creating, with the at least one processor, a computer model to represent the eligibility rule set, the model comprising: a flat grid structure comprising a plurality of fields storing the values and a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure. The operations and components may further include associating, using the at least one processor, a computer interface with the model; receiving, by the computer interface, an attribute; determining, with the at least one processor, one more elements of the computer interface associated with the attribute by evaluating the eligibility rule set; and updating the computer interface to display the one or more elements determined by the eligibility rule set.

Other embodiments consistent with the present disclosure include systems, methods, and computer program products for establishing and enforcing volume limits that include operations and components for receiving, by the at least one processor from the database, volume limit data from a plurality of grids including attributes that define a volume limit threshold; generating, by the at least one processor, a rule set based on the volume limit; and creating, by accessing data in the database, one or more information grids comprising a plurality of cells, wherein each cell contains a value representing data from the plurality of grids and has a location in the one or more information grids. The operations and components may additionally include creating, with the at least one processor, a computer model to represent the rule set, the model comprising: a flat grid structure comprising a plurality of fields storing the values and a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure. The operations and components may further include associating, using the at least one processor, a computer interface with the model; receiving, by the computer interface, a request for a transaction; determining, with the at least one processor, whether the requested transaction is within the volume limit by evaluating the rule set; and responsive to a determination that the requested transaction is allowed by the rule set, processing the transaction.

Other embodiments consistent with the present disclosure include systems, methods, and computer program products for establishing and enforcing global resources that include operations and components for receiving, by the at least one processor from in the database, global resource data from a plurality of grids including attributes that define a global resource rule set and creating, by accessing data in the database, one or more information grids comprising a plurality of cells, wherein each cell contains a value representing data from the plurality of grids and has a location in the one or more information grids. The operations and components may additionally include creating, with the at least one processor, a computer model to represent the rule set, the model comprising: a flat grid structure comprising a plurality of fields storing the values and a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure. The operations and components may further include associating, using the at least one processor, a computer interface with the model; receiving, by the computer interface, a request for a transaction; determining, with the at least one processor, whether the global resource rule set applies to the requested transaction; and responsive to a determination that the global resource rule set applies to the requested transaction, accessing the model to retrieve global resource data.

Advantages of the disclosed embodiments will be set forth in part in the description which follows, and in part will be obvious from the description, or may be learned by practice of the disclosed embodiments. The advantages of the disclosed embodiments may be realized and attained by means of the elements and combinations particularly pointed out in the appended claims.

It is to be understood that both the foregoing general description and the following detailed description are exemplary and explanatory only and are not restrictive of the claimed embodiments.

BRIEF DESCRIPTION OF THE DRAWINGS

The accompanying drawings, which are incorporated in and constitute a part of this specification, illustrate various features, embodiments and aspects of the disclosed embodiments and, together with the description, explain advantages and principles of the disclosed embodiments. In the drawings, FIG. 1 is an exemplary pricing grid for a mortgage product, consistent with disclosed embodiments;

FIGS. 4-A through 4-E illustrate exemplary data structures for a tree representation of an information grid, consistent with disclosed embodiments;

FIG. 6 shows an exemplary embodiment of a graphical user interface for creating and maintaining an information grid, consistent with disclosed embodiments;

FIGS. 8A-8B show exemplary embodiments of a graphical user interface for creating and maintaining an approval threshold, consistent with disclosed embodiments;

FIGS. 10A-10B show exemplary embodiments of a graphical user interface for creating and maintaining eligibility rule sets, consistent with disclosed embodiments;

FIG. 12 shows exemplary embodiments of a graphical user interface for creating and maintaining volume limit rule sets, consistent with disclosed embodiments;

DESCRIPTION OF THE EMBODIMENTS

Figure 2:
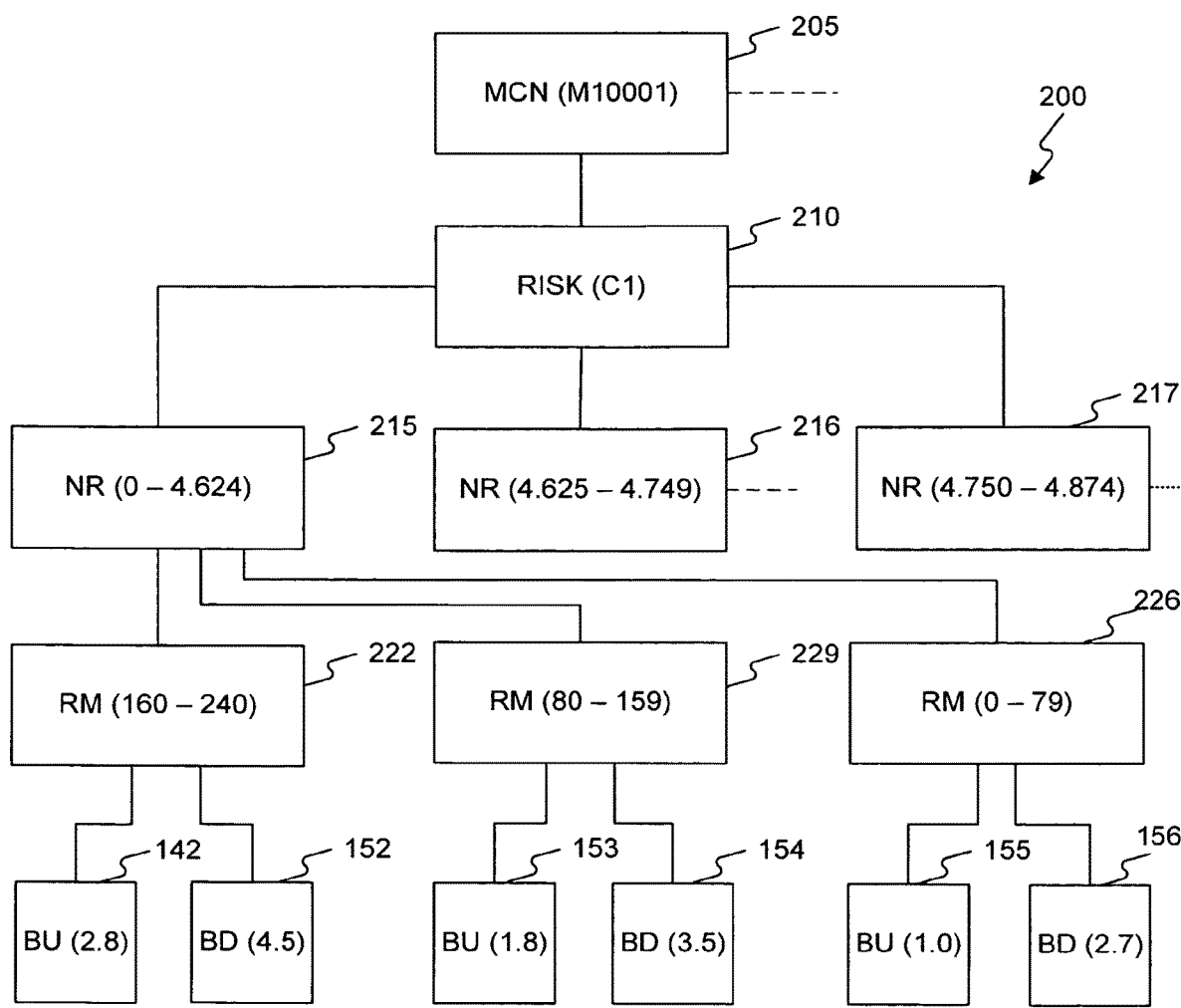
FIG. 2 is an exemplary representation of an information grid in a tree structure, consistent with disclosed embodiments.

Reference will now be made in detail to exemplary embodiments, some of which are illustrated in the accompanying drawings. Wherever convenient, similar reference numbers will be used throughout the drawings to refer to the same or like parts. The implementations set forth in the following description do not represent all implementations consistent with the disclosed embodiments. Instead, they are merely some examples of systems and methods consistent with the disclosed embodiments.

Overview

Embodiments of systems and methods consistent with the principles of the disclosed embodiments use a data/object model to represent information grids or lookup tables, such as a mortgage asset pricing information grid. The model allows a software representation for logically different attributes, fostering consistency in the interpretation of the data, reuse of certain application components such as data and object models, persistence logic, and user interface constructs. Advantageously, using a data/object model allows for customization within a software application without modifying the underlying pricing engine, allows for integration with cloud computing for less reliance on physical hardware platforms, and allows for the use of multiple instances of the same pricing engine.

Information Grid

In the disclosed embodiments, a computerized information grid is used by mortgage buyers, such as Freddie Mac, to store, manage, and retrieve large volumes of data in grid format for analysis and computer modeling associated with different aspects of mortgage assets. Different combinations of mortgage asset attributes, (such as risk, interest rate, and remaining maturity), result in different values for pricing components, (such as buyup multipliers, buydown multipliers, guarantee fees (G-fees), adjustments, such as a seller-specific discount, etc.).

For example, FIG. 1 is an exemplary representation of a logical grid of pricing information for a mortgage product, in accordance with the principles of the present disclosure. The grid shown in FIG. 1 represents a lookup table for finding the buyup and buydown multipliers for various combinations of mortgage asset attributes, namely MC Number, risk class, note rate, and remaining maturity. MC Number denotes a Master Commitment Number, which is a user assigned identification number used to distinguish from other Master Commitment numbers, for example based on the type of mortgage asset. Risk class denotes a risk attribute for a mortgage asset, such as credit risk or prepayment risk. Risk class may be determined according to fluid algorithms by evaluating characteristics of loan terms (such as borrower capacity borrower repayment history) and evaluating the property itself to identify historical correlations to delinquency and default rates. For example, risk class C1 may denote a lower risk mortgage asset than class C2, which may denote a relatively lower risk mortgage asset than class C3. Note rate denotes the interest rate of the mortgage asset, such as the APR of a mortgage loan. Remaining maturity denotes the amount of time remaining before the mortgage asset finally matures, such as 180 months left to go on a 360 month mortgage loan. BuyUp and BuyDown denotes multiplier amounts used to determine a one-time payment to or from the mortgage asset purchaser in exchange for an increase or reduction of the guarantee fee rate for the mortgage asset. Thus, for a buydown, this number is the multiplier that the mortgage asset buyer charges sellers for a basis point decrease in the guarantee fee. A buydown allows the seller of the mortgage asset to reduce or eliminate the guarantee fee in exchange for a single payment to the buyer, where the buyer also performs a guarantor function, such as Freddie Mac. A buyup has the opposite effect.

As shown, the grid 100 may be divided logically into columns, such as the columns labeled "MC [master commitment] Number" 105, "Risk Class" 110, "Note Rate" 115, "BuyUp per Remaining Maturity" 120 and "BuyDown per Remaining Maturity" 130. In the representation shown, some of the columns are further logically divided into subcolumns, such as BuyUp Remaining Maturity "160-240 [months]" 122, BuyUp Remaining Maturity "80-159 [months]" 129, and BuyUp Remaining Maturity "0-79 [months]" 126.

Mortgage asset buyers use the information in a grid such as the one shown in FIG. 1 for determining the correct factor to use in calculating a buyup/buydown price component, and ultimately the net price, for a mortgage asset. "Net price" refers to the total amount of money that the seller will be paid. "Price components" are the separately determined parts that combine to create the net price for a particular mortgage asset. For example, the net price for a mortgage asset may include a guarantee fee (Gfee) plus a seller adjustment amount minus a buy-down amount (or plus a buy-up amount).

For the mortgage asset example, the computation of the pricing components may be performed using the buyer's computer data system or it may be performed by a third party computer system. If an outside service is being used to perform the computation of a pricing component, it may also be used to identify and retrieve the necessary data for performing such computation. Furthermore, if multiple pricing components need to be computed, some may be computed by the buyer, while others, often in parallel, may be computed using outside services. In some embodiments, a net pricing service engine may be used to compute the net price for a mortgage asset from pricing components and data received from separate component pricing service(s).

In the specific example of FIG. 1, a computer system may use information in pricing grid 100 to find a buyup or buydown multiplier pricing component for a mortgage asset specified by the attributes in the grid columns. As mentioned, a buydown pricing component reduces the guarantee fee rate on a mortgage asset specified by the attributes in the grid columns, and buy up has the opposite effect.

As shown in FIG. 1, the multiplier for buying up the guarantee fee rate for a mortgage asset having the attributes MC Number="m10001," Risk Class="C1," Note Rate="0-4.624 percent," and Remaining Maturity="60-240 months" is 2.8, which is the lookup value in cell 142. Similarly, a mortgage asset having the same attributes, except with a Note Rate between 4.625 and 4.749 percent, has a BuyUp multiplier of 2.7, (as shown by the value in cell 144), and a similar mortgage asset with a Note Rate between 4.750 and 4.874 percent has a BuyUp multiplier of 2.6 (as by the value in cell 146).

Similarly for BuyDown lookups, a mortgage asset having an MC Number attribute of m10001, a Risk Class attribute of C1, a Note Rate attribute of between 0 and 4.624 percent, and a Remaining Maturity attribute of between 160 and 240 months has a BuyDown factor of 4.5 (as show by the value in cell 152). As further examples, a mortgage asset having the same attributes, except with a Remaining Maturity between 80 and 159 months, has a BuyDown factor of 3.5 (as show by the value in cell 154), and a similar mortgage asset with a Remaining Maturity between 0 and 79 months has a BuyDown multiplier of 2.7 (as show by the value in cell 156). As noted above, a computer system uses information in grid 100 to determine one of the pricing components, BuyUp or Buydown, of a mortgage asset according to the attributes laid out in the rows and columns of the information grid 100.

Information grids provide for data organization that is attribute dependent, and pricing grids organize price information because the price of an item is often dependent upon the items attributes. For example, the price components for a new car may be organized in a two dimensional grid with model lines in the rows, optional equipment in the columns, and the additional cost of adding a particular piece of optional equipment to a particular model line listed in the cell at the intersection of the appropriate row and column.

Prior pricing systems and other types of information grid lookup systems, information grid implementations are typically static, with attributes and terms represented by individual columns in a database table. Using static database table structures to hold pricing grid information, however, has a number of technical disadvantages, such as a lack of flexibility to change the grid design and data. For example, with a static database table structure holding pricing grid information, a change in pricing policy that uses a not-previously-used attribute requires changes in the pricing engine which executes the pricing algorithm on the grid information, changes to the database user interface to allow the new attribute information to be entered into the database, changes to the database tables by adding columns to hold the new attribute information, data conversions to fill in new pricing information calculated from the new attribute, changes to the data retrieval logic to include the new data from the database tables, and changes to the application object structure to include the new data.

Traditional systems using static database table implementations often require workarounds that make grid information difficult to create, organize, maintain, access, and report, especially within a large organization having many users of the database grid information. Such workarounds include manual steps in otherwise automated processes that decrease operational efficiency; the use of customized, stand-alone, end-user computing systems that perform further processing of basic, centrally stored grid information, decentralized data entry that lead to data inconsistencies and lack of control of centrally stored grid information, and the use of grid information "adjusters" that are not centrally stored, controlled, accessible, or universally known in the organization. The disclosed embodiments address these technical drawbacks by restructuring grid data as a tree structure such as those disclosed herein.

Information Grid Represented as a Tree

As can be seen in FIG. 1, values for certain attributes are often repeated many times in a tabular data structure, in order to represent every permutation of each attribute and resolve to a unique lookup value (in this case, a buyup or buydown value) for every possible combination of attributes. For example, the three note rate range values (0 to 4.624 percent, 4.625 to 4.749 percent, and 4.750 to 4.874 percent) in note rate column 115 are repeated three times; once each for possible value of the risk class, C1, C2, and C3. Moreover, FIG. 1 is a condensation of the how the information is conventionally stored in a database table, because a tabular data model requires a separate row for each of the three remaining maturity columns, such that each risk class—note rate combination shown in FIG. 1 requires three rows in a tabular database. For example, the one row in FIG. 1 for MC Number m10001, Risk Class C1, and Note Rate 0 to 4.624 percent is stored in three rows in a database table as shown in Table 1:

TABLE 1

| MC Number | Risk Class | Note Rate | R. Maturity | BuyUp | BuyDown |
|---|---|---|---|---|---|
| M10001 | C1 | 0 to 4.624 | 160-240 | 2.8 | 4.5 |
| M10001 | C1 | 0 to 4.624 | 80-159 | 1.8 | 3.5 |
| M10001 | C1 | 0 to 4.624 | 0-79 | 1 | 2.7 |

In some embodiments, a tree data structure is used to represent the data in information grids, reducing or eliminating the redundancy of having to represent the same attribute-value pairs many times in the data structure, thereby providing technical benefits of reducing the required computer and data storage resources.

FIG. 2 is an exemplary representation of a grid in a tree structure consistent with disclosed embodiments. In this example, a portion of the pricing grid 100 shown in FIG. 1 is represented as a tree structure 200. As shown in FIG. 2, the root node 205 of the tree 200 is the MC Number attribute "M10001." The child of root node 205 is node 210, which corresponds to risk class attribute C1. In grid 100 of FIG. 1, there are three possible risk classes 110: "C1," "C2," and "C3." FIG. 2 shows only the details of risk class C1 at node 210, and the other risk classes C2 and C3 are represented by the dashed line extending from the right side of the box representing root node 205.

Risk class C1 node 210 has three children nodes: node 215, node 216, and node 217. Node 215 represents note rate attribute 0.000%-4.624% under risk class C1 from grid 100 of FIG. 1. Similarly, node 216 and node 217 represent note rate 4.625%-4.749% and note rate 4.750%-4.874%, respectively, under risk class C1 from grid 100 of FIG. 1.

For clarity of illustration, FIG. 2 shows a complete tree representation for only the BuyUp/BuyDown pricing information corresponding to note rate 0.000%-4.624% from grid 100, with the pricing information corresponding to note rate 4.625%-4.749% and note rate 4.750%-4.874% represented in abbreviated form by the dashed lines extending from the sides of the boxes representing nodes 216 and 217.

Node 215, representing note rate 0.000%-4.624%, has three children nodes: node 222, node 229, and node 226. Node 222 represents remaining maturity category attribute 160-240 months for mortgage assets with note rate 0.000%-4.624% and a risk class of C1 as shown in grid 100 of FIG. 1. Similarly, node 229 and node 226 represent remaining maturity categories 80-159 months and 0-79 months, respectively, for mortgage assets with note rate 0.000%-4.624% and a risk class of C1 as shown in grid 100 of FIG. 1.

Each of node 222, node 229, and node 226 has two leaves. A leaf is a type of node that has no children. The leaves in FIG. 2 represent the buyup and buydown information from grid 100 of FIG. 1. For example, node 222 has leaf 142 representing the buyup factor of "2.8" for mortgage assets with a remaining maturity of from 160-240 months, a note rate between 0.000%-4.624%, and a risk class of C1, as shown by buyup factor 142 in grid 100 of FIG. 1. Similarly, node 222 has another leaf 152 representing the buydown factor of "4.2" for mortgage assets with a remaining maturity of from 160-240 months, a note rate between 0.000%-4.624%, and a risk class of C1, as shown by buydown factor 152 in grid 100 of FIG. 1.

Node 229 and node 226 similarly have two leaves representing the buyup and buydown factors for mortgage assets having the attributes specified by the nodes higher in the tree hierarchy. For example, buydown leaf 154 corresponds to buydown factor 154 (value=3.5) in grid 100 of FIG. 1 and buydown leaf 156 corresponds to buydown factor 156 (value=2.7) in grid 100 of FIG. 1.

Figure 3:
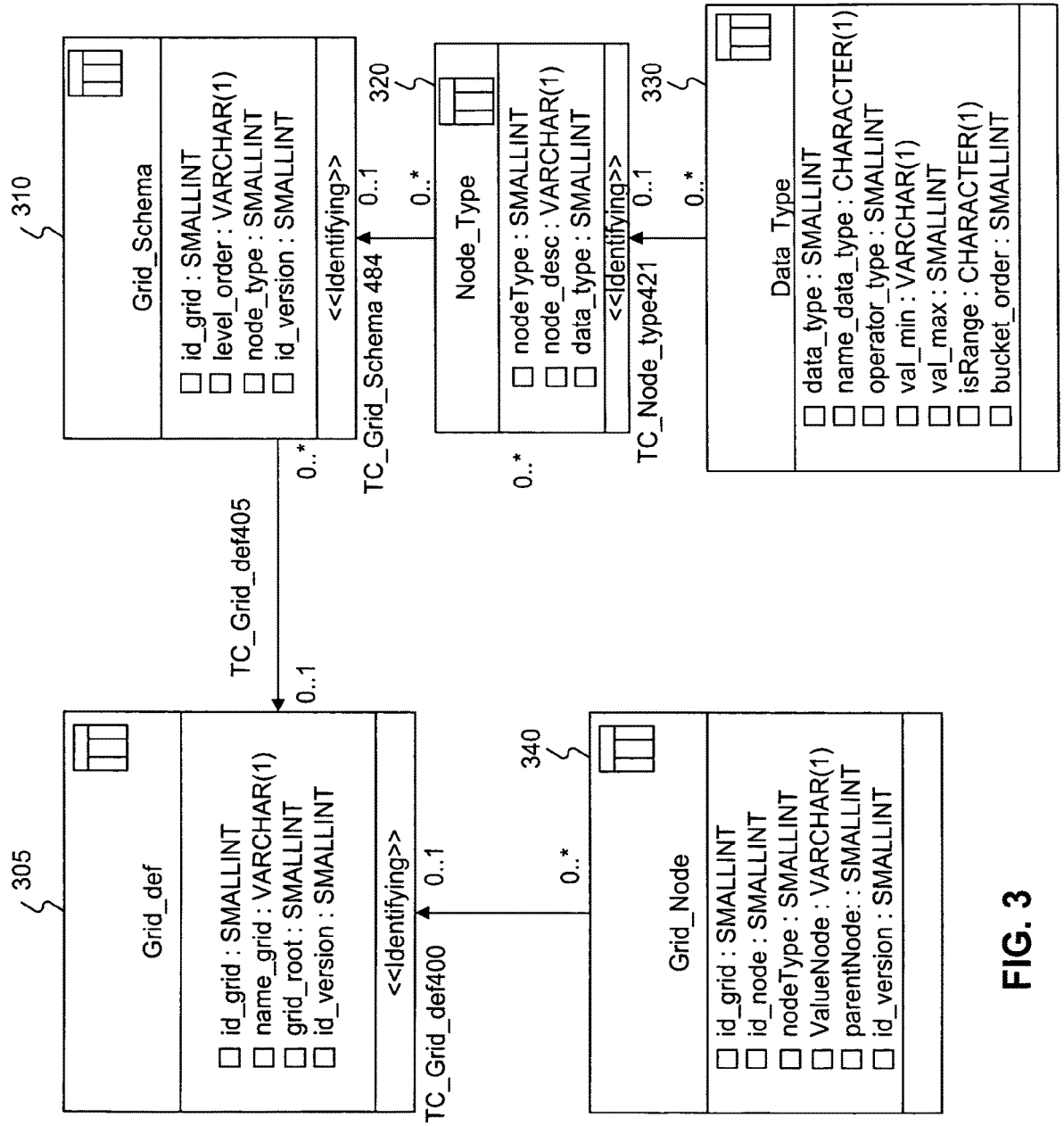
FIG. 3 shows an exemplary data model to support a tree representation of an information grid, consistent with disclosed embodiments.

FIG. 3 shows a block diagram of an exemplary data model to implement a tree representation of an information grid, consistent with disclosed embodiments. The data model may be used to represent each node of a tree (such as tree 200 of FIG. 2) representing an information grid (such as pricing grid 100 of FIG. 1). This may allow the exemplary data model to capture large quantities of different types of information grids using a small set of data models. As shown, the data model includes a grid definition 305 that includes fields for uniquely defining and identifying a grid, such as a grid id (id_grid), a grid name, a grid root identifier (grid_root), and a version identifier. Grid definition 305 may be useful for specifying a particular grid in systems using more than one type of grid (such as one grid used for computing a guarantee fee for a mortgage asset and a second grid used for computing a buydown for the mortgage asset), and systems containing different versions of the same grid (such as an initial version of a buydown grid, and a second, modified version of the buydown grid). In some embodiments, a grid may be defined as a template or master copy. A user may use a template or master copy grid to create a new instance or version of a grid to be used for a similar or specified purpose as the template or master copy. The system may implement constraints on the structure or use of the template or master copy grid. Using template or master copy grids and separate instances and versions thereof ease operations burdens by decreasing the number of grids within a system and decreasing the number of grids to be processed, for example, at runtime.

The exemplary data model illustrated in FIG. 3 contains two main parts interrelated to grid definition 305. The first is grid node 340, and the second is grid schema 310, which is itself further related to node type 320 and data type 330. The grid node 340 holds the actual data associated with a node, including a reference to the node's parent. The grid schema 310 and related node type 320 and data type 330 contains data about grid node 340, (such as metadata), specifying grid node 340's place in the tree data structure, node type, and data type. Together, the grid node 340, data structure 305, and the grid schema 310 (with node type 320 and data type 330) specify the data contained in each box or cell of an information grid that is being modeled, and that data's relationship to the other data in the grid, such as, the cell's position in the information grid, where the grid is represented as a tree model. This data structure can support any number of attributes from an information grid, as now nodes and leaves can be easily added to a tree model without requiring an update to or modification of the underlying code or software.

FIGS. 4-A through 4-E further illustrate the exemplary data structures from FIG. 3 using information from the exemplary pricing grid 100 shown in FIG. 1. FIG. 4-A shows the fields 401 of a grid definition table 405 (corresponding to the grid definition data structure 305 of FIG. 3) and exemplary data for each field 402 based on the information in the exemplary pricing grid 100 of FIG. 1. The fields 401 specify a unique ID for the grid, a name for the grid, the starting node of the grid, and a version ID for the grid. The exemplary values 402 relating to pricing grid 100 show that the id_grid field has a value of 1885 (an arbitrary number), the name_grid field is set to "bubd" (a name meant to indicate buyup/buydown), the grid_root field is set to the value 10001 (which is the value of the MC Number attribute 105 from FIG. 1), and the id_version field is set to the value 1 (indicating this is the first version of this information grid).

FIG. 4-B shows the fields 411 of a grid schema 410 (corresponding to the grid schema data structure 310 of FIG. 3) and exemplary data for each field 412 based on the information in the exemplary pricing grid 100 of FIG. 1. The fields 411 specify the unique ID for the grid, the level of the node in the tree structure representing the grid, the type of node, and the version ID for the node. The exemplary values 412 relating to pricing grid 100 show that the id_grid field has a value of 1885 (corresponding to the value set in grid definition table 405 and indicating the relationship to grid definition table 405), the level_order has possible values of 1-5 (indicating that the tree representation of grid 100 has five possible node levels, as shown in FIG. 2), the node_type field has possible values of 45-50, (indicating that the tree representation of grid 100 has six possible node/leaf types, as shown in FIG. 2), which correspond to specific level_order values, (e.g., a level one node may only be of type 45, but a level 5 leaf may be of type 49 or 50), and the id_version field is set to the value 1 (indicating the current version of the node).

FIG. 4-C shows the fields 421 of a node type 420 (corresponding to the node type data structure 320 of FIG. 3) and exemplary instances of data for each field 422 based on the information in the exemplary pricing grid 100 of FIG. 1. The fields 421 specify the type of the node, the name of the node, and the data type of the node. The exemplary values 422 relating to pricing grid 100 show that the node_type field has possible values of 45-50, the node_desc field has six possible values—"masterCommitmentNumber," "RiskClass," "NoteRate," "RemainingMaturity," "buyup," and "buydown" (corresponding to the six mortgage asset attributes shown in pricing grid 100 and the six possible node/leaf types shown in the tree representation of grid 100 in FIG. 2), and the datatype field has four possible values, 100-103. Each of the datatypes corresponds to a specific nodetype(s). For example, masterCommitmentNumber nodes and RiskClass nodes are of datatype 100, while RemainingMaturity nodes are of datatype 102.

FIG. 4-D shows the fields 431 of a data type 430 (corresponding to the data type data structure 330 of FIG. 3) and exemplary instances of data for each field 442 based on the information in the exemplary pricing grid 100 of FIG. 1. The fields 431 specify the data type of the node, the primitive data type of the node, the kind of operation that can be applied to the data type, the minimum value and maximum value (if the datatype is a range), a range indicator flag, and a bucket number indicating the subrange of a larger range.

The exemplary values 442 relating to pricing grid 100 show that the datatype field has four possible values, 100-103, that the name_data_type primitive uses a string to store datatype 100 and a double length float to store the other data types. The operator type is "RI" (meaning range inclusive) for datatype 101 (444) and datatype 102 (446), and there is no operator type for datatypes 100 and 103 (meaning operations cannot be performed on these datatypes).

Val_min and Val_max have minimum and maximum range values set according to the attribute ranges shown in pricing grid 100, and bucket_order specifies the number of subranges for a given datatype. For example, note rate 115 (represented by datatype 101 (444)) has 3 subranges (or buckets), 0.000%-4.624%, 4.625%-4.749%, and 4.750%-4.874%, and the minimum and maximum values of each of these three ranges is specified by val_min, val_max, and bucket_order for datatype 101 (444). Similarly, remaining maturity 120 and 130 (represented by datatype 102 (446)) has 3 subranges (buckets), 160-240 months, 80-159 months, and 0-79 months, and the minimum and maximum values of each of these three ranges is specified by val_min, val_max, and bucket_order for datatype 102 (446). The isRange field is set to "Y" to indicate datatypes that are ranges, and set to "N" to indicate datatypes that are not ranges, such as datatype 100 (masterCommitmentNumber) and datatype 103 (448) (buyup or buydown).

As an example, consider the case were data_type 430 has the values shown in row 445, node_type 420 has the values shown in row 423, grid_schema has the values shown in row 413, and grid_def 405 has the values shown in row 412. This instance of the data structure describes a node having the characteristics of node 215 of FIG. 2. Row 445 also describes the Note Rate 0-4.624% nodes for risk classes C2 and C3 as well (not shown in FIG. 2). Similarly, row 447 describes node 222 of FIG. 2, and the corresponding nodes under risk classes C2 and C3 (not shown). Also similarly, row 448 describes leaves 142, 152, 153, 154, 155, and 156 of FIG. 2, and the corresponding leaves under risk classes C2 and C3 (not shown).

While the above-described exemplary instances of data structures specify generally what each node is and how it fits into a tree representation of an information grid, FIG. 4-E shows exemplary instances of a grid node 440 (corresponding to the grid node data structure 340 of FIG. 3), which contains the actual value(s) for a node described by data type 430, node type 420, and grid schema 410. The exemplary data for each field 452 is based on information in the exemplary pricing grid 100 of FIG. 1, as represented by the tree shown in FIG. 2. The fields 451 specify the unique ID for the grid, a unique ID for the node, the type of node, the value of the node, a reference to the parent node, and the version ID.

The exemplary values 452 relate to specific nodes of tree 200 of FIG. 2, which represents pricing grid 100 of FIG. 1. For example, while Row 445 of the data type 430 describes the three Note Rate 0-4.624% nodes for risk classes C1, C2, and C3, the added information from row 454 of grid node 440 shows that this data structure corresponds to node 215 of tree 200, which is a node in the path to all the buyup and buydown values for the three remaining maturity buckets under risk class C1, note rate 0-4.624% as shown in FIG. 2.

In another example, the values in row 460 of grid node 440 corresponds to leaf 142 of FIG. 2, which corresponds to grid-column intersection 142 of FIG. 1, which indicates a buyup factor of 2.8 for a mortgage asset having MC number M10001, risk class C1, note rate 0-4.624%, and remaining maturity of 160-240 months according to the pricing grid of FIG. 1. As can be seen in row 460 of FIG. 4-E, "ValueNode" is set to 2.8 (the buyup value F56) and node_type is 49, indicating a buyup node of datatype 103, as shown in node_type 420 of FIG. 4-C. Similarly, row 461 of FIG. 4-E, (which corresponds to leaf 152 of FIG. 2 and column-grid intersection 152 of FIG. 1), has "ValueNode" set to 4.5 (the buydown value 458) and node_type set to 50, indicating a buydown node of datatype 103, as shown in node_type 420 of FIG. 4-C.

Using the parentNode fields in the rows 452 and the information in the data type structure 430, node type structure 420, and grid schema 410, one can traverse up through the parent nodes 222, 215, and 210 to the root node 205 of the tree 200. A grid node 440 defines the parent-child relationships, which allows traversal and management of the entire composite structure composed of all the nodes in the tree 200.

One embodiment consistent with the present disclosure represents an information grid in the form of a tree data structure and stores, accesses, and maintains it as such in a database. In this embodiment, to retrieve an information grid or a portion of a grid, the user (e.g., through a client application) specifies a grid ID and one or more nodetypes defined in the grid schema. The system retrieves the schema for the grid and the tree structure is created from the grid criteria specified. Specifying more nodetypes in the criteria will narrow down the result set that is returned. The system returns the result set to the requesting user, which may or may not contain children. In some embodiments, the grid schema may also be returned to the user.

In some embodiments, the user may flatten the result set to display the retrieved node and its child nodes in a tabular form, such a rectangular lookup table or grid layout. A tabular presentation for the user interface may aid the user's comprehension of the data. Nonetheless, how the grid data is displayed to a user is not tightly coupled to, or dictated by, the data structure that holds the grid information. Different user applications may display the grid data differently.

To create a grid, the user specifies a grid id and one (or more) nodetype(s) and its level in the tree. This definition forms the basis for the grid schema and the subsequent grid to be created. A grid tree can then be created and validated based on the grid schema, which is persisted with the tree data.

Tree nodes may be updated via a similar process used to locate a specific node in the retrieval process. In one embodiment, update constraints may be applied to users, and users may be allowed or required to create new versions of grids, leaving old versions intact. In some embodiments, the structure of the tree may be validated after an update occurs.

Figure 5:
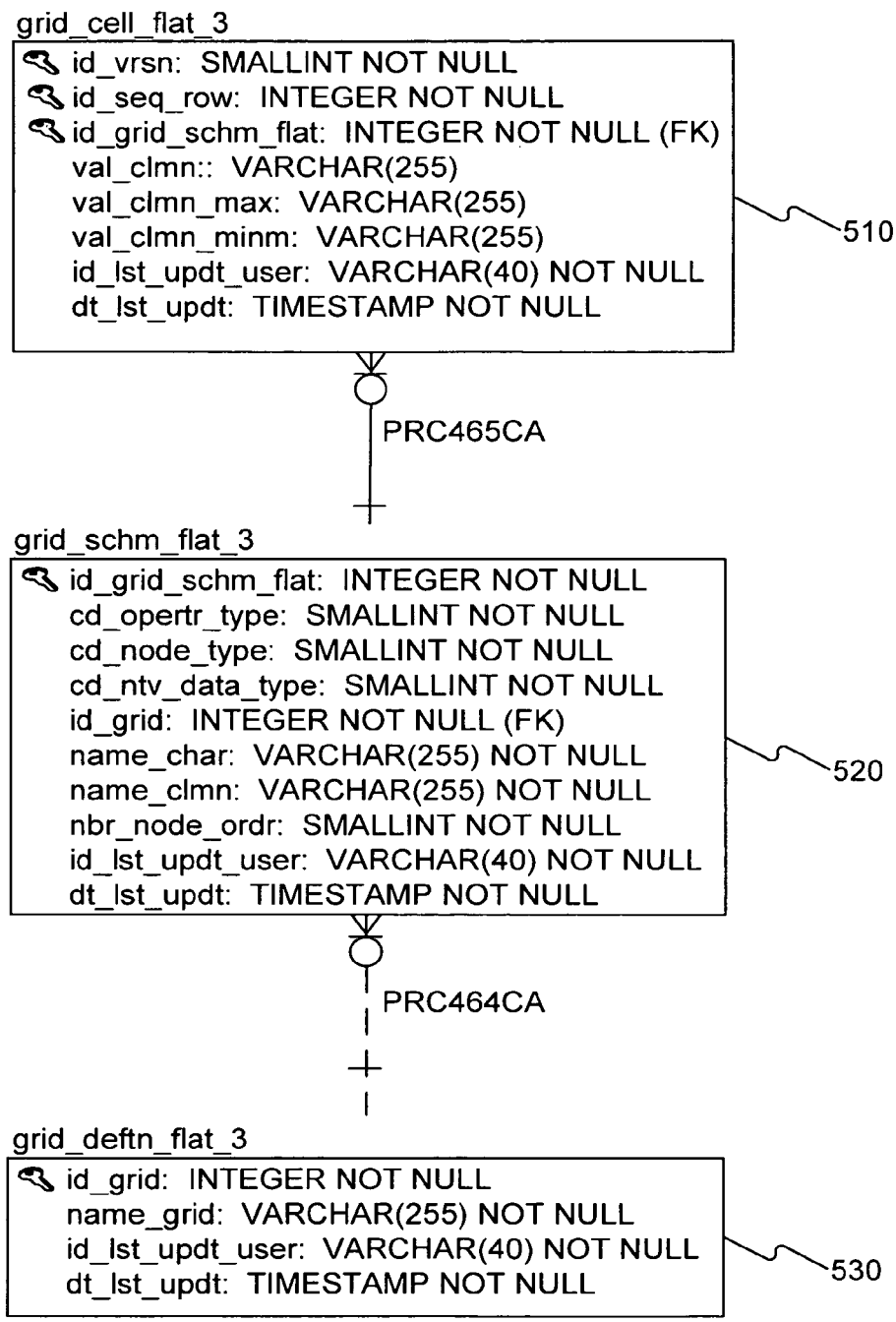
FIG. 5 shows an exemplary data model for a flat grid representation of an information grid, consistent with disclosed embodiments.

A tree data structure is not the only way to represent the data in an information grid. FIG. 5 shows an exemplary data model to support a flat grid representation of an information grid, consistent with the principles of the disclosed embodiments. Like the tree data model, this flat data model may be used to represent each cell of an information grid (such as pricing grid 100 of FIG. 1). As shown, the flat data model includes a grid cell representation 510 that includes fields for version ID, row ID, grid schema ID, column value, maximum column value, minimum column value, user who last updated the grid cell, and date of the last update.

As shown, the flat data model also includes a grid schema representation 520 that includes fields for grid schema ID, column value, operator type, node type, data type, grid ID, character name, column name, node order, user who last updated the grid schema, and date of the last update.

The flat data model also includes a grid definition representation 530 that includes fields for grid id, grid name, user who last updated the grid definition, and date of the last update.

Like the tree data model, the flat data specifies both the data contained in each box or cell of an information grid that is being modeled, and the data's relationship to the other data in the grid, such as the box's position in the information grid, where the grid is represented as a table.

Some embodiments consistent with the present disclosure represent an information grid in the form of a flat data model and access and maintain it as such in a database.

One embodiment consistent with the present disclosure uses both a tree data model and a flat data model to represent an information grid. In this embodiment, the tree data model is used when an information grid is being created or changed, in order to take advantage of the ease with which the tree model can be validated, and the flat data is used to persist the information grid in storage, in order to take advantage of the storage access speed provided by the flat data model, which may be significantly faster than that offered by the tree data model in some implementations. In this embodiment, a common grid interface provides an interface for client applications that works for both tree model objects and flat model objects.

In yet another embodiment consistent with the present disclosure, the attributes for an information grid may be placed in a denormalized vertical table with a fixed number of columns. This embodiment also uses a metadata table that describes the attributes in the denormalized vertical table, and the metadata table coupled with the entries in the denormalized vertical table defines the information grid. This embodiment uses a predefined, N generic column table large enough to hold all the potential attributes for the data in the information grid. At least initially, some of the columns will contain nulls as there will be no corresponding data from the information grid. As attributes are added to the information grid, previously null columns are used to hold the additional information. Data retrieval from this data structure is simple row retrieval, as contrasted with the more complex node traversal of the tree data structure embodiment.

One of ordinary skill will recognize that the data models described, such as the tree data model of FIG. 3 and the flat grid model of FIG. 5, are generic models that may be used to represent any type of information grid. Thus, common user interfaces, common create, read, update, and delete operations, etc. that work with the tree data model can be used to work with many different information grids implemented using the tree model. For instance, to continue with the pricing grid examples, determining the price of a mortgage asset may involve gathering pricing components from several pricing grids, such as a pricing grid that contains information to determine the guarantee fee for the mortgage asset, a pricing grid that contains information to determine the seller-specific discounts for the mortgage asset, and a pricing grid to determine the buyup/buydown payment. Each of these information grids typically use different combinations of loan-specific attributes, contract-specific attributes, and/or product-specific attributes to define their pricing components. Nonetheless, by using a common data model to represent each of the pricing grids, they may all be accessed using the same client applications to determine the net price for the mortgage asset. Data management and maintenance and control of the information in the information grids may also be similarly simplified by the use of the same client maintenance and control client applications for all of the grids.

User Interface to Grid Data

Figure 6:
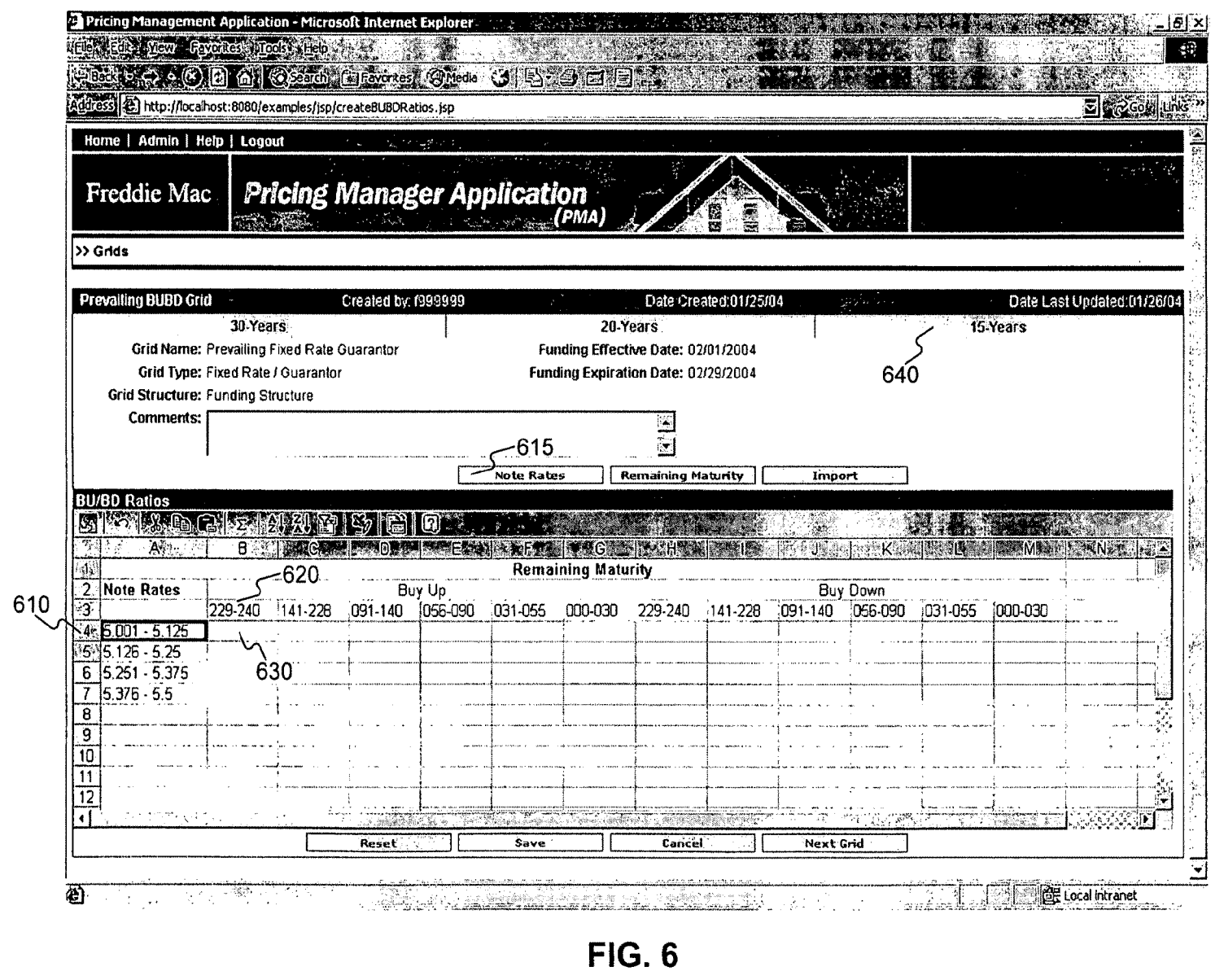

In one embodiment consistent with the present disclosure, information grids, such as pricing grid 100, are created and maintained by a user using a dynamic GUI front-end, which may be web-based. FIG. 6 shows an exemplary embodiment of a graphical user interface for creating and maintaining an information grid consistent with disclosed embodiments. As shown, an information grid is presented to the user in a logical, two-dimensional tabular format, regardless of whether the underlying data model is a tree model, or a flat grid model, or some other model. The example of FIG. 6 illustrates a mortgage asset pricing grid interface, and as shown, enumerated attributes, such as the type of mortgage asset, may be represented as a series of buttons indicating the possible values of the attribute 640. Attributes with more user-adjustable variability, such as subranges of a note rate, may be selectable by a button, such as note rates button 615, and once selected, entered by the user in a tabular format 610. Similarly, other attributes, such as remaining maturity range 620, may be adjusted by the user, changing the number and/or size of the "buckets" that categorize a mortgage asset in this example. Also similarly, the user may enter the values of the buyup and buydown factors for each combination of note range bucket and remaining maturity bucket, such as entering a the buyup value for note rate 5.001-5.125%, remaining maturity 229-240 months in cell 630. In one embodiment consistent with the present disclosure, values entered by a user, such as note rate range value 610 or buyup factor 630, are validated by the system to be sure they are within acceptable ranges, do not overlap, are the correct data type, etc.

In one embodiment consistent with the principles of the present disclosure, this single user interface and data management model is used to create, read, update, and delete information in multiple grids of information, such as a buyup/buydown price component grid, a Gfee price component grid, and a discount price component grid, because all of the multiple grids are modeled in the same way.

In one embodiment consistent with the present disclosure, the user interface is implemented as a JSF/J2EE™ or REST Architecture web application, using Javascript framework, which allows users to enter, manipulate, save, and retrieve information grid data. One of ordinary skill will recognize that other ActiveX™ controls, or equivalents to ActiveX™ controls, could be easily substituted to provide the same functionality as the Javascript framework. Additionally, or alternatively, the user interface may receive an information grid representing a rule or set of rules from an external user. The external user may provide semi-structured rules, such as a JavaScript Object Notation (JSON) document to be stored in a non-relational database such as MongoDB. The rules provided by an external user may reflect preferences associated with the external user to be stored using the described data model and enforced by the system 700 secondary to rules created by an administrator or internal user.

One embodiment implements a set of common interfaces representing the grid model, and clients (such as such as an application presenting the GUI of FIG. 6) are not concerned with the actual underlying implementation (e.g. tree data model, flat data model, or some other data model that generically represents both the value and the meaning and context of the data in an information grid). Thus, if the underlying data model implementations are later changed, the clients are unaffected, as the common interfaces remain the same.

Computing System

Figure 7:
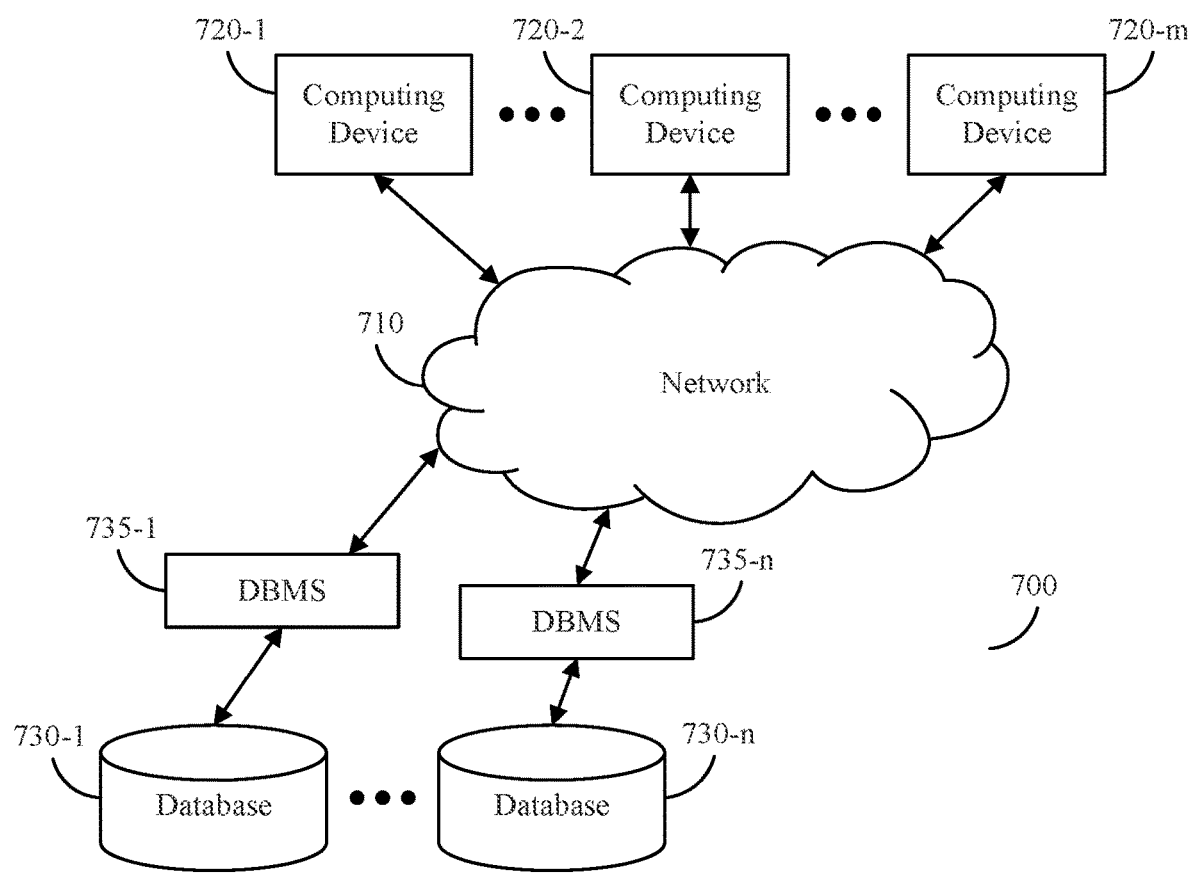
FIG. 7 illustrates an exemplary computing system that can be used to implement the disclosed embodiments.

FIG. 7 illustrates an exemplary computing system 700 that can be used to implement the disclosed embodiments. The components and arrangement, however, are not critical. One of ordinary skill will recognize that embodiments of the present disclosure may be implemented by computers or workstations organized as shown, organized in a distributed processing system architecture, or organized in myriad suitable combinations of software, hardware, and/or firmware.

As shown, computing devices 720 may be coupled to one or more communication networks such as network 710. The network 710 may enable communication between different elements in system 700 that may be communicatively coupled with the computing device 720, as further described below.

One or more computing devices 720-1 through computing device 720-m, where 'm' in an integer equal to or greater than 1, referred to individually as computing device 720 and collectively as computing devices 720, may be communicatively coupled to a network 710. The network 710 may include the Internet, the world-wide-web (WWW), a local area network (LAN), a wide area network (WAN), a metro area network (MAN), and other networks capable of enabling communication between the elements of the computing system 700. In some embodiments, network 710 may enable communication between computing devices 720, such as between computing devices 720-1, 720-2, and/or 720-m. In other embodiments, computing devices 720 may communicate with one another via a separate local network, separate wide area or global network, or via direct connection links (not shown).

In some disclosed embodiments, the computing device 720 may be a server deployed in a cloud computing environment. In some embodiments, devices 720-1 through 720-m may be communicatively coupled in a distributed computing system or cloud computing system that is scalable to meet the data processing demands of the techniques disclosed herein, especially when the disclosed techniques are used to model valuations for large quantities of loans in regions affected by a catastrophic event such as a natural disaster.

Any of computing devices 720 may include, for example, a smart phone, a mobile phone, a laptop, a tablet computer, a wearable computing device, a personal computer (PC), a workstation, or one or more known processing devices, such as a microprocessor from the Pentium family manufactured by Intel™ or a mainframe-class processor. A computing device 720 may be configured to send to and receive data and/or metadata.

Each computing device 720 may include a number of components (not illustrated), such as a controller, processor, or central processing unit (CPU), a memory, and input/output (I/O) device(s). The controller, processor, or CPU may be one or more known processing devices, such as a microprocessor or mainframe-class processor manufactured by AMD™ or Intel™. Computing devices 720 may comprise one or more memory modules or devices (not illustrated). Memory may include one or more storage devices configured to store information used by CPU 710 to perform certain functions, operations, and steps related to embodiments of the present disclosure. Memory may include a magnetic, semiconductor, tape, optical, or other type of storage device. In one embodiment, memory includes one or more software application programs that, when executed by one or more processors, perform various processes consistent with the present disclosure. For example, memory may store a tree model application that, when executed by one or more processors, creates objects representing an information grid as a tree data structure. As another example, memory may include a flat model application that, when executed by one or more processors, creates objects representing an information grid as a flat data structure. Memory may also include other programs that perform other functions consistent with embodiments of the present disclosure, such as a program that provides a user interface that displays and allows manipulation of the tree data in a tabular format.

Computing device 720 memory may be also be configured with an operating system (not shown) that performs several functions well known in the art when executed by one or more processors. By way of example, the operating system may be Microsoft Windows™, Unix™, Linux™, an Apple™ operating system such as MAC OSX™, mobile device operating system such as Apple™ jOS™, Google™ Android™, or other operating system. The choice of operating system, and even to the use of an operating system, is not critical.

I/O device(s) may comprise one or more input/output devices that allow data to be received and/or transmitted by system 700. For example, I/O devices may include one or more input devices, such as a network connection, keyboard, touch screen, mouse, microphone, and the like, that enable data to be input or received from a user. Further, I/O devices may include one or more output devices, such as a network connection, display screen, printer, speaker devices, and the like, that enable data to be output or presented to a user. The configuration and number of input and/or output devices incorporated in I/O devices are not critical.

Methods, systems, and articles of manufacture consistent with the disclosed embodiments are not limited to programs configured to perform dedicated tasks. For example, a computing device 720 may include memory containing a program that performs several functions consistent with the disclosed embodiments when executed by the computing device 720. Alternatively, computing device 720 may execute one or more programs located remotely from system 700. For example, system 700 may access one or more remote programs stored in a database 730 that, when executed, perform functions related to embodiments of the present disclosure. The configuration and number of programs implementing processes consistent with the present disclosure are not critical.

One or more databases 730-1 through database 730-n, where 'n' in an integer equal to or greater than 1, referred to individually as database 730 and collectively as databases 730, may be communicatively coupled with the computing device 720 via the network 710, or embedded within the computing device 720. Each database 730 may be communicatively connected to the network 710 through one or more database management services (DBMS) 735-1 through DBMS 735-n. The database 730 may be for example, a storage device containing a database, a data warehouse, and the like, that may be used for storing data structures, data items, metadata, or any information, as further described below. In some embodiments, one or more of the databases may be distributed over several physical storage devices, e.g., in a cloud-based computing environment. Any storage device may be a network accessible storage device, or a component of the computing device 720.

Database 730 may comprise one or more databases that store information and are accessed and managed through system 700. By way of example, database 730 may be an Oracle™ database, a Sybase™ database, MongoDB, or any other relational or non-relational database. One embodiment described above uses database 730 to persist the common data models representing information grids. Systems and methods of the present disclosure, however, are not limited to separate databases or even to the use of a database as other organized collections of data or memory systems will serve as well. In some embodiments, the system may be a cloud-based system. For example, the methods described herein may be executed in a virtual instance by a remote computer, rather than a local processor. Additionally or alternatively, cloud-based computation may include the use of microservices for separating and running portions of system 700 across multiple servers connected via a network and the results may be compiled, combined, or fed into additional systems, methods, and processes. Cloud-based computation can provide advantages in scalability, cost, and security over approaches that rely on local computational or conventional servers. For example, the described data model may be ported between different database structures based on advancements in computing technology without needing to be rebuilt or tailored to the specific database requirements.

Embodiments of systems and methods consistent with the principles of the disclosed embodiments include a pricing engine which captures a business logic for applying pricing rules. The pricing engine is then contained, packaged, and distributed such that multiple instances of the same engine are used.

Approval Thresholds

Disclosed embodiments may include creating user levels which are linked to approval thresholds, and representing user levels as a data model. User level may refer to a permissions level associated with the user. Approval thresholds may include rules governing which user levels may approve changes to different pricing terms based on things like product, volume limits, and planned duration of the price level. These rules may be implemented using the data model disclosed herein. Additionally or alternatively, the user levels may govern who may approve change requests, such as changes to pricing terms including fees (e.g., a delivery fee or guarantee fee) or any other data stored as information in a grid. For example, a user profile associated with a vice president may have a user level with a greater number of permissions and higher authority than a user profile having a user level for a senior director, who in turn may have greater authority than user profiles for directors, who in turn may have greater authority than user profiles for managers, to approve change requests.

Approval thresholds may be represented in grid form. The threshold grid may represent the limitations of a user level as a function of attribute values and operators associated with an attribute, or as any other data and relationship between data represented in the grid. The computing system (such as system 700) may then receive the information grid and transform the grid into the data model disclosed herein for implementation as part of the pricing engine.

Approval thresholds may be set or created upon the creation or setup of a specific user profile by an administrator or modified at any time by someone with an appropriate approval threshold to approve the change to the approval threshold. By way of example, FIG. 8A shows a first exemplary embodiment of a graphical user interface for creating and maintaining an approval threshold. As shown, the system may receive input identifying a plurality of approval threshold characteristics, such as an approval threshold name 801, an effective date and time 803 for the approval threshold, a resource type 805 associated with the approval threshold, and a resource name 807. The system 700 may receive an approval threshold description 809. Continuing the example, FIG. 8B shows a second exemplary embodiment of a graphical user interface for creating and maintaining an approval threshold. The system may receive information for one or more attributes via selection of an "Add Attribute(s)" button 811 and information for metadata via selection of an "Add Metadata" button 813 that may be displayed in a threshold grid structure interface 815. The threshold grid structure interface 815 may be generated by the system based on the user inputs, or may be received in grid format. The threshold grid 815 may represent the limitations of a user level as attribute values 817 and operators 819 that define the approval threshold limits. In this example, Row 1 821 represents a threshold of a fee (BPS) in yield greater than 31, an overall PT volume limit of less than $4 billion, an assessment period of greater than or equal to 60 days, any product type with a 30-year fixed mortgage, where the user's role is a pricing credit assistant. Upon saving the entered information, the system can then transform the displayed grid representing an approval threshold into a data model as disclosed herein for implementation as part of the pricing engine.

In some embodiments a data model may be used to implement a tree representation of an information grid containing approval thresholds associated with user profiles. The data model may be used to represent each node of a tree representing the information stored in grid form. The data model may specify the information contained in each box or cell and the information's relationship to the other data in the grid. For example, the data model may identify a user profile and the user profile's relationship to an approval threshold.

Establishing multiple user levels and approval thresholds can allow for increased compliance with policies for approving a change request. Disclosed systems and methods can also improve and enforce a workflow within a large organization. For example, the user levels and approval thresholds can ensure that when a first user creates change request, a second user will review the change request, and the second user has the appropriate approval threshold in order to approve the change request. The approval threshold of a user can be evaluated when a user requests to change information within the data model used to establish prices. In some embodiments, the ability to perform a certain approval task is linked to the approval threshold associated with a user level, and thus a user without the appropriate approval threshold would be unable to circumvent the workflow process. The disclosed systems and techniques proactively enforce approval permissions in a preventative manner, thereby conserving system resources and time upon over conventional systems that only verify compliance after actions were taken (such as via an audit or after-the-fact review) rather than.

In some embodiments, a pricing engine of system 700 may execute a set of rules for defining an approval threshold in response to a triggering event. A triggering event may include when a change request is assigned to a user for approval, when a user performs the approval task, when a rule governing an approval threshold is created, when a rule governing an approval threshold is updated, or upon any other event creating, updating, or modifying a change request or approval threshold. For example, the system may run the rules when a change request is assigned to a user for approval in order to ensure that the change request is assigned to a user with the appropriate approval threshold to approve the change request. The system may re-evaluate the rules when the user performs the approval task in order to ensure that the user's approval threshold has not changed because an individual user's approval threshold may change at any time.

The system can implement versioning in order to increase efficiency, speed, and conserve resources. Versioning may include storing version history comprising multiple instances of variable and data associated with the multiple instances such as a time or a date associated with a change to the variable. The system can execute the rule set in response to one or more triggering events. In some embodiments, system 700 may first determine whether a version history associated with the user profile indicates a change to the rules since the last evaluation. If the version history indicates no changes, then the system may forego re-evaluating the rules and use a previous result of applying the rules to a user to determine an approval threshold. If the version history indicates a change to the rules, then the system may re-evaluate the rules to determine an approval threshold.

By way of example, the representation of approval threshold rules using a grid-structure and tree model may set up a rule that creates a change request when a user makes a change of more than an amount from a base as defined in the rule. The user interface may then prompt the user to assign the change request to another user with a minimum approval threshold.

Figure 9:
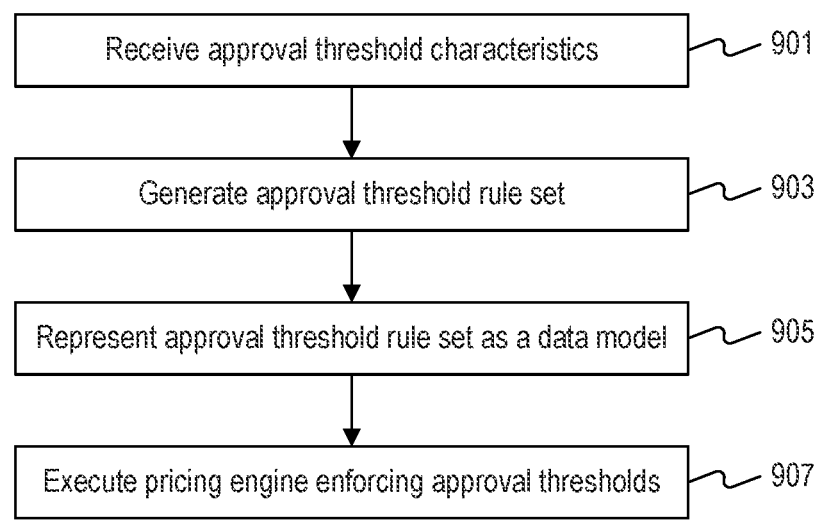
FIG. 9 illustrates an exemplary flowchart creating for modifying an approval threshold rule set, consistent with disclosed embodiments.

FIG. 9 illustrates an exemplary flowchart creating or modifying an approval threshold rule set. At step 901, system 700 may receive approval threshold characteristics via a graphical user interface. At step 903, system 700 may generate a threshold value rule set and represent the threshold value set in grid form. At step 905, system 700 may represent approval threshold rule sets as a data model consistent with techniques disclosed herein. At step 907, system 700 may execute the pricing engine and enforce approval thresholds.

Eligibility Rule Sets

In some embodiments, system 700 may provide for creating eligibility rule sets and representing eligibility rule sets as a data model. Eligibility rule sets may determine the functionality within a system or the screens and components of a dynamic graphical user interface that are available to a third party user such as a seller in order to reflect overarching policies or business practices. Overarching policies and business practices may be reflected as limitations or incentives on products or services based on geography, seller type, product type, product volume, or any combination thereof. Eligibility rule sets may be created by an administrator and govern which products or services that an internal user such as an account manager may present to a seller via the dynamic graphical user interface. Based on the products or services identified by the internal user as available to a seller, the eligibility rule sets may dictate which screens or components of the dynamic graphical user interface are presented to a seller. The screens or components of the dynamic graphical user interface may include options and details associated with the products and services presented. Eligibility rule sets may improve system 700 by enforcing data quality and completeness.

An eligibility rule set may be assigned to a group of internal users or sellers based on a common or shared attribute, or assigned to each internal user or seller individually. Eligibility rule sets may be used to delineate virtual boundaries within the system 700 and allow an administrator to customize access to data and features within the system 700 based on a secondary user's role, function, or purpose.

An eligibility rule set may include a time or length parameter which may correspond to the incentives or limits defined by the eligibility rule set. The time or length parameter may be linked to a calendar period (e.g., October 1-October 31), an event (e.g., the beginning of a relationship or a time period between transactions), or measured on a rolling basis (e.g., the last 7 days). Primary and dependent eligibility rules sets may share a time or length parameter or may have individual time or length parameters.

In some embodiments, an eligibility rule set may be layered such that one or more eligibility rule set is conditioned on or depends from another eligibility rule set. For example, an administrator may create a primary layer 1013 corresponding to an eligibility rule set which is independent of any other eligibility rule set. The administrator may create a first layer 1029 corresponding to one or more eligibility rule sets which depend on conditions set forth by the eligibility rule set in the primary layer. Thereby, the system 700 may determine the functionality within a system or the screens and components of a dynamic graphical user interface that are made available to a seller by evaluating the eligibility rule sets and interdependencies of eligibility rule sets as disclosed herein. In further embodiments, the administrator may create multiple layers corresponding to interwoven, conditional, or interdependent eligibility rule sets. Advantageously, layering eligibility rule sets represented and stored using the data model disclosed herein may allow system 700 to automatically adjust third party interaction with system 700 via a dynamic graphical user interface without modifying the underlying software. Moreover, the dependencies of layered eligibility rule sets may provide an improved dynamic graphical user interface by limiting the components displayed to include only relevant components.

An administrator may create and store an eligibility rule set based on parameters associated with each set of rules as attributes of an available product or service. In some embodiments, system 700 may receive the parameters as inputs from the administrator, or by input from the administrator via a graphical user interface. In some embodiments, an attribute may be classified as a primary attribute or a secondary, additional, or dependent attribute which is based on a conditional relationship established by the eligibility rule set and the primary attributes. An eligibility rule set may allow or require an internal user to access or input dependent attributes based on primary attributes. Parameters defining an eligibility rule set may be input via a graphical user interface which stores and/or presents the data in grid form or received in grid form. The system may receive the parameters as a grid and transform the grid into a data model as disclosed herein for implementation as part of the pricing engine.

After an eligibility rule set is created, the system 700 may evaluate the rule set by utilizing an evaluation framework that accesses the eligibility rules stored in the data model in order enforce the rules by guiding an internal user to set up screens or components of a dynamic graphical user interface. An evaluation framework may include instructions for accessing each eligibility rule set stored in grid form to return the conclusion for setting up each phase, component, or screen of the dynamic graphical user interface. The eligibility rule sets guide the flow of screens of the dynamic graphical user interface by limiting an internal user's interaction to include only those elements which are associated with the services or products offered to the third party user. The enforcement of the eligibility rule sets may guide the internal user to set up products, services, or related options that are relevant to the attributes selected while preventing the internal user from setting up products, services, or related options that are contradictory or irrelevant based on the attributes selected.

The system 700 may implement versioning in order to increase efficiency, speed, and conserve resources, as disclosed herein. The system 700 may evaluate an eligibility rule set in response to every triggering event or the system 700 may first determine if version history indicates a change to the eligibility rule set. If version history indicates that there are no changes, the system 700 may forego re-evaluation of the rules and use a previous version of applying the eligibility rule set to determine the options presented to the seller via a dynamic graphical user interface depending on attributes selected. If the version history indicates a change to the rules, then the system may re-evaluate the rules to determine an approval threshold. Additionally or alternatively, the system may pre-cache results associated with an attribute by evaluating an eligibility rule set each time an eligibility rule set are created, changed, or updated and storing the results of the evaluation in the version history. Then, in response to a triggering event, the system may retrieve the results from the pre-cache rather than re-executing the entire eligibility rule set.

Figure 10B:
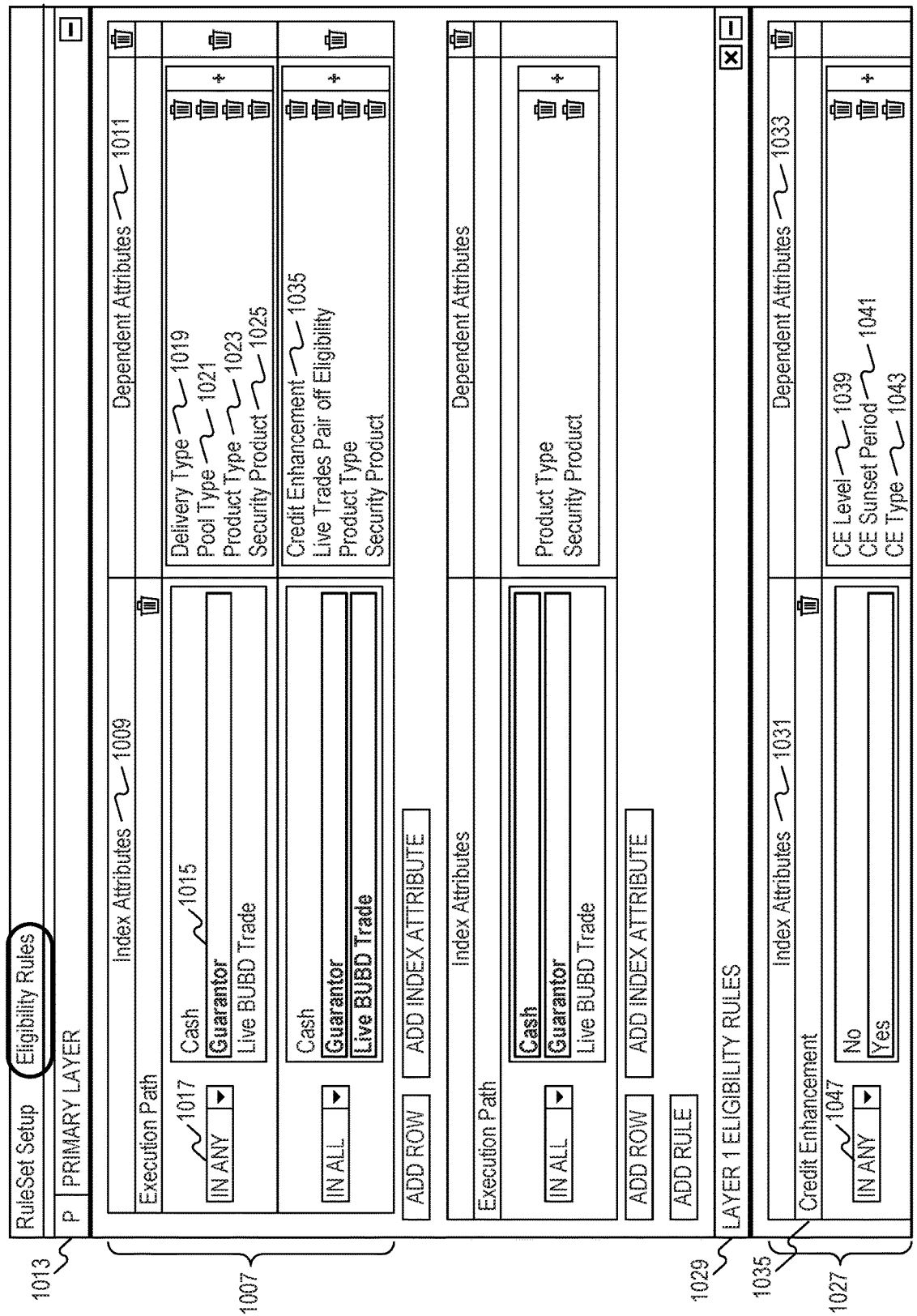

By way of example, FIG. 10A shows a first exemplary embodiment of a graphical user interface for creating and maintaining eligibility group rule sets. As shown, the system 700 may receive input identifying certain eligibility rule set characteristics, such as an eligibility rule set name 1001, an effective date and time 1003, and a description 1005 of the eligibility rule set from an administrator. Continuing the example, FIG. 10B shows a second exemplary embodiment of a graphical user interface for creating and maintaining eligibility rule sets. The system 700 may generate a first eligibility rule set based on administrator input or may receive an eligibility rule set in grid format from the administrator. The first eligibility rule set grid 1007 may define for the system 700 primary index attributes 1009 and dependent attributes 1011 within a primary layer 1013. In this example, when a seller performs the role of guarantor 1015 in any 1017 transaction, the system 700 may provide the internal user access to dependent attributes or require the internal user to input dependent attributes including delivery type 1019, pool type 1021, product type 1023, and security product 1025.

System 700 may generate a second eligibility rule set based on administrator input or may receive an eligibility rule set in grid format from the administrator. The second eligibility rule set grid 1027 may define for the system 700 a second layer eligibility rule set 1029. Second layer eligibility rule set 1029 may include index attributes 1031 and dependent attributes 1033 within the first layer eligibility rule set 1027. In this example, when the system 700 provides the seller the option for credit enhancement 1035 in the first eligibility rule set grid 1007, then the first layer eligibility rule set 1029 may define for the system 700 or require input of dependent attributes 1033 including credit enhancement level 1039, credit enhancement sunset period 1041, and credit enhancement type 1043. System 700 may provide the seller access to or require from the seller dependent attributes 1033 when the index attribute credit enhancement 1035 is selected in any 1047 transaction.

The system 700 may save or store in memory the first eligibility rule set grid 907 and second eligibility rule set grid 1027. The system may transform the stored grids into the data model as disclosed herein for implementation as part of the pricing engine.

In some embodiments a data model may be used to implement a tree representation of an information grid containing eligibility rule sets associated with a user. The data model may be used to represent each node of a tree representing the information stored in grid form. The data model may specify the information contained in each box or cell and the information's relationship to the other data in the grid. For example, the data model may identify an entity's role in a transaction and specify the attributes available to the entity based on the identified role.

Figure 11:
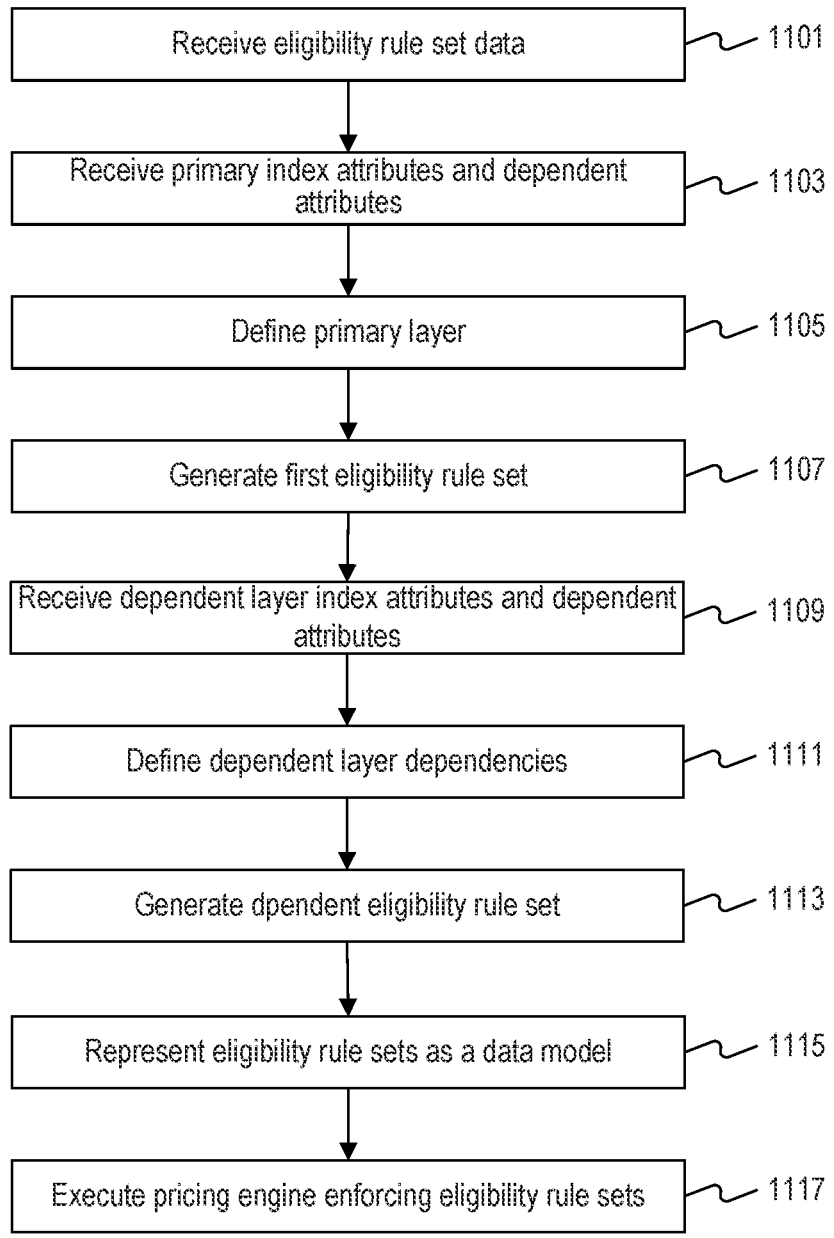
FIG. 11 illustrates an exemplary flowchart creating or modifying eligibility rule sets, consistent with disclosed embodiments.

FIG. 11 illustrates an exemplary flowchart creating or modifying an eligibility rule set. At step 1101, system 700 may receive eligibility rule set characteristics from an administrator via a graphical user interface. At step 1103, system 700 may receive primary index attributes and dependent attributes from the administrator defining relationships between primary index attributes and dependent attributes. At step 1105, system 700 may define a primary layer set of attributes which are independent of other attributes associated with other eligibility rule sets. At step 1107, system 700 may generate a first eligibility rule set based the primary layer.

At step 1109, system 700 may receive dependent layer index attributes and dependent attributes and define the relationship between layer index attributes and dependent attributes within the dependent layer. At step 1111, system 700 may define conditions, dependencies, or other relationships between the attributes of the dependent layer and the attributes of the primary layer. At step 1113, system 700 may generate a second eligibility rule set based the dependent layer which reflects the conditions, dependencies, or other relationships between the dependent layer and the primary layer. At step 1115, system 700 may represent and store the first and second eligibility rule sets as a data model. At step 1117, system 700 may execute the pricing engine and enforce the eligibility rule sets using an evaluation framework that accesses the eligibility rules stored in the data model.

Volume Limits

In some embodiments, the system 700 may enforce limits for volumes of digital transactions. Volume limits may be represented within the system 700 as a data model. In addition to the technical improvements provided by the disclosed embodiments, volume limits may provide the additional secondary benefits of improving and automating risk management for digital transactions. Volume limits may include limits enforced by system 700 on the number or amount of transactions, commitments, or contracts with an entity based on attributes measured and associated with the transactions, commitments, or contracts. The attributes may include homebuyer characteristics, property characteristics, lender characteristics, loan product characteristics, loan type, loan amount, municipality characteristics, or any other characteristic describing the property, the loan, or the transaction between the buyer and seller. These limits may be applied to individual transactions or may also include a time period or length of time. For example, system 700 may limit the formation or proposal of a contract exceeding a maximum dollar amount. As another example, system 700 may limit a total amount of cash business conducted by a first entity with a second entity within a calendar month.

Volume limits may be expressed as rules and represented in grid form to be enforced by system 700 within the pricing engine. The system 700 may generate rules describing and outlining volume limits by receiving user input via a graphical user interface or receive the rules expressed in grid form. The system 700 may transform the rules from grid form into a data model as disclosed herein for implementation as part of the pricing engine.

The system 700 may enforce the rules governing volume limits against the data that is being delivered by utilizing an evaluation framework that accesses the volume limits stored in the data model. The system 700 may enforce volume limits at a contract level or at a user level, depending on the specific volume limit rules. In some embodiments, the system 700 may generate and output an alert or notification such as displaying a message via a graphical user interface indicating that the limit has been reached. In other embodiments, the system 700 may automatically limit or omit functionality or options for further transactions of a type or volume from the graphical user interface displayed to the user. Additionally or alternatively, the rules describing and outlining volume limits may alter or provoke conditional responses reflected in other aspects of the interaction, such as pricing. For example, the system 700 may enforce volume limits by the use of pricing tiers. Pricing tiers may include automatically assigning prices based on volume thresholds. Volume thresholds may increase or decrease pricing terms or factors as the amount of transactions or contracts between a first entity and a second entity surpasses an amount defined by a volume limit rule. The system 700 may automatically adjust and display updated pricing terms via the dynamic graphical user interface according to the volume limit rules.

For example, system 700 may monitor cash transactions for a first entity (such as ABC Bank) and may compare a running count of transactions to a volume limit rule set limiting the number of cash transactions that the first entity may conduct with a second entity (such as Freddie Mac). So long as the running count of transactions is less than volume limit in the eligibility rule set, system 700 may allow a first entity to conduct additional transactions with the second entity. Additionally, or alternatively, the system 700 may compare a running count of transactions or total aggregated transaction dollar amount to a volume limit set which includes a maximum number of transactions or a maximum total aggregated transaction dollar amount for a given time period.

By way of example, FIG. 12 shows an exemplary embodiment of a graphical user interface for creating and maintaining volume limit rule sets. As shown, the system 700 may receive volume limit rule characteristics, such as volume limit name 1201, a volume limit description 1203, an assessment date type 1205, an assessment period start date 1207, an assessment period end date 1209, and an overall volume limit 1211. The system 700 may additionally receive a lower threshold type 1213, a lower threshold value 1215, an upper threshold type 1217, and an upper threshold value 1219.

The system 700 may save or store in memory one or more volume limit rule sets in grid form. The system may transform the stored grids into the data model as disclosed herein for implementation as part of the pricing engine.

Figure 13:
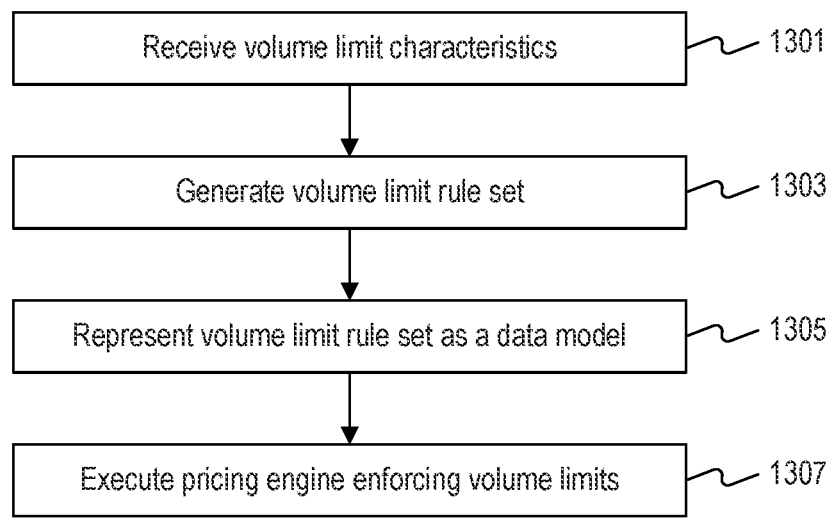
FIG. 13 illustrates an exemplary flowchart creating or modifying volume rule sets, consistent with disclosed embodiments.

In some embodiments a data model may be used to implement a tree representation of an information grid containing volume limit rule sets associated with a user. The data model may be used to represent each node of a tree representing the information stored in grid form. The data model may specify the information contained in each box or cell of the information grid and the information's relationship to the other data in the grid. For example, the data model may store or count a number of contracts or transactions initiated by the user and the system 700 may enforce the volume limit rules by updating pricing terms or by adding or removing available features within a graphical user interface. FIG. 13 illustrates an exemplary flowchart creating or modifying a volume limit rule set. At step 1301, system 700 may receive volume limit characteristics via a graphical user interface. At step 1303, system 700 may generate a volume limit rule set and represent the volume limit rule set in grid form. At step 1305, system 700 may represent and store volume limit rule sets as a data model. At step 1307, system 700 may execute the pricing engine and enforce one or more volume limits based on the generated volume limit rule set.

Global Resources

In some embodiments, the system 700 may create, store, and/or use global resources. The system may represent global resources as a data model. Global resources may include pricing factors that apply to large classifications of transactions, such as regulatory factors associated with cash transactions specific to a seller or group of sellers. Additionally, global resources may include data or parameters that control the system's 700 behavior with respect to a seller or group of sellers dependent on the seller's or group of sellers' relationship with the system. For example, global resources may give preference to certain sellers by devoting greater system resources to sellers based on a volume of transactions delivered or a perceived value or importance as a customer. Because global resources may apply to all user levels, roles, or classifications, conventional systems may hard-code or manually enter these values, making it difficult or impossible to quickly modify or update a system such as a pricing mechanism to meet the demands of current fast-paced electronic transactions. However, as disclosed herein, a global resource may be stored as a data model and implemented as part of a pricing engine to enhance the ability of the system to dynamically adapt to different conditions, conserve resources, and improve user experience with increased speed and accuracy. Thus, representing and storing the global resources using the data model allows for greater flexibility and quicker modifications to the pricing engine because nodes and leaves can be added to a tree model without changing the other nodes or the data structure itself while preventing access by outside users. Another advantage may be the ability of end users to configure system behaviors without requiring developer or technical support. Additionally or alternatively, global resources may be specific to an individual user or class of users.

In some embodiments, global resources may include single value, product specific, seller specific, and product mapping global resources. Single value global resources may represent a single value that may apply to an entire classification of transaction types, all sellers, and all products. The system 700 may receive the single value global resource value in grid form or the system 700 may generate the single value global resource value based on user input via a graphical user interface. For example, a value representing Days to Fund may apply to all transaction types, all sellers, and all products.

Product specific global resources may represent values that are specific to product classifications or other attributes which remain constant for all sellers. The system 700 may receive the product specific global resource value in grid form or the system 700 may generate the product specific global resource value based on user input via a graphical user interface.

Seller specific global resources may represent values that are specific to an individual specific user across all cash transactions. The system 700 may receive the seller specific global resource value in grid form or the system 700 may generate the seller specific global resource value based on user input via a graphical user interface. The Best Efforts Hedge Cost grid is an example of a seller specific global resource.

Global resources may be stored in a lightweight data-interchange format that may be easy for humans to read and write, and also easy for machines to parse and generate, such as a JavaScript Object Notation (JSON) document. Storing the global resources in this way may facilitate the use of cloud-based computing and databases, allowing for increased scalability, resilience, and reliability. When the pricing engine is evaluated, the global resources are deserialized from the lightweight data-interchange format and transformed into a tree model for implementation as part of the pricing engine.

Figure 14:
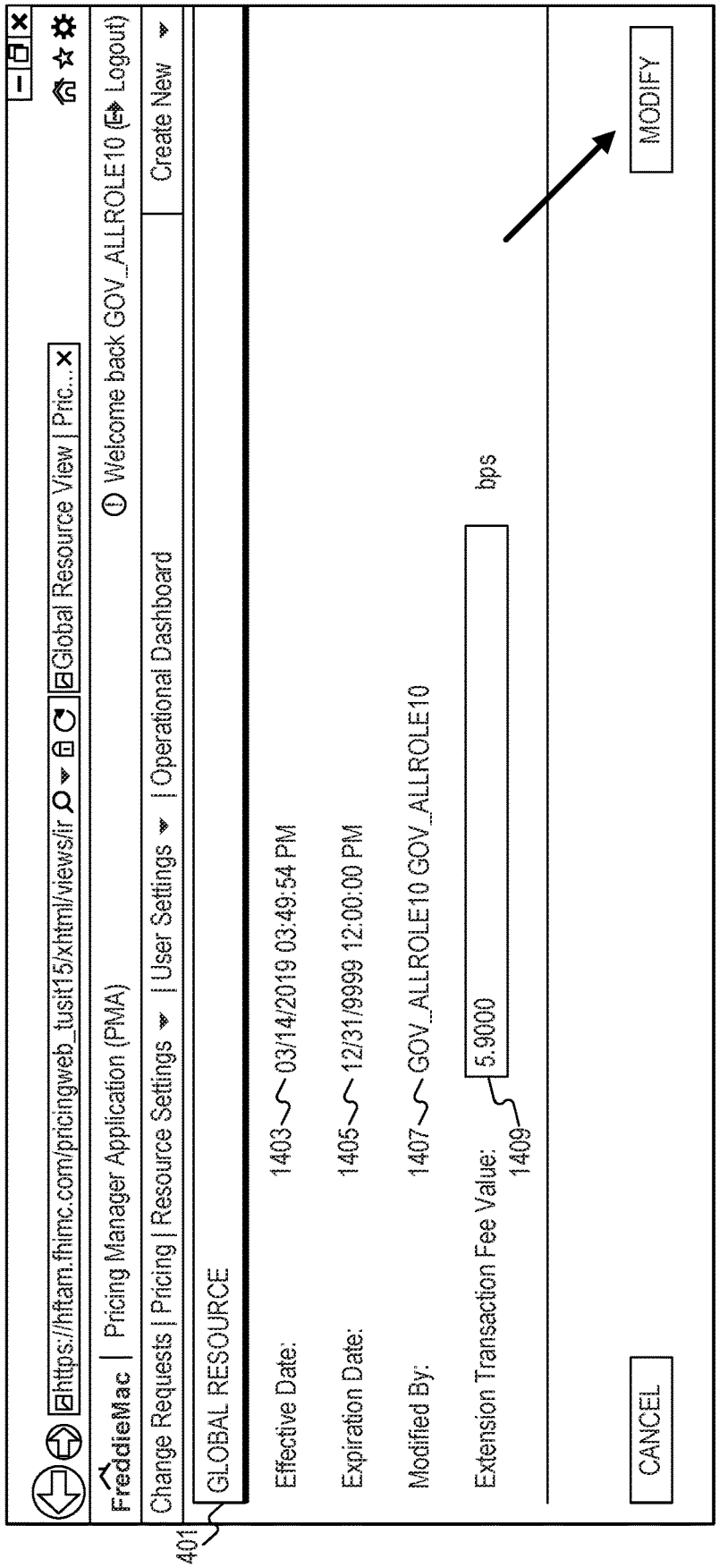
FIG. 14 shows exemplary embodiments of a graphical user interface for creating and maintaining global resources, consistent with disclosed embodiments.

By way of example, FIG. 14 shows an exemplary embodiment of a graphical user interface for creating and maintaining global resources 1401. As shown, the system 700 may receive a global resource 1401 and global resource characteristics such as a global resource effective date 1403, a global resource expiration data 1405, a user profile identifier 1407, and a global resource value 1409. The user profile identifier may indicate which user profile created or modified a global resource 1401.

The system 700 may save or store global resources in memory in grid form. The system 700 may transform the stored grids into one or more data models as disclosed herein for implementation as part of the pricing engine.

In some embodiments a data model may be used to implement a tree representation of an information grid containing global resource values. The data model may be used to represent each node of a tree representing the information stored in grid form. The data model may specify the information contained in each box or cell and the information's relationship to the other data in the grid. For example, the data model may global resource values associated with interest rates or an adjustment after a range of business hours.

Figure 15:
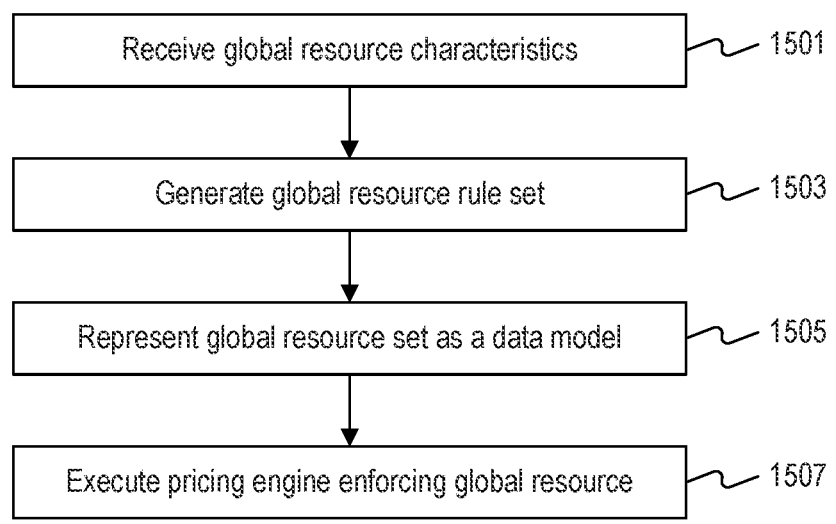
FIG. 15 illustrates an exemplary flowchart creating or modifying global resources, consistent with disclosed embodiments.

FIG. 15 illustrates an exemplary flowchart creating or modifying a global resource rule set. At step 1501, system 700 may receive global resource characteristics via a graphical user interface. At step 1503, system 700 may generate a global resource rule set and represent the global resource rule set in grid form. At step 1505, system 700 may represent global resource rule sets as a data model. At step 1507, system 700 may execute the pricing engine and enforce global resources.

Although many of the foregoing examples were presented in the context of pricing for mortgage assets, one of ordinary skill will easily recognize that the principles of the present disclosure are not necessarily so narrowly limited and can be applied in most contexts where information may logically be represented in the form of an information grid or lookup table. The disclosed embodiments may be applied to a credit scoring engine, loan editing and decision services, rules around data or credit quality, foreclosure or default management, or any other data driven model. One of ordinary skill will also recognize that embodiments consistent with the present disclosure may be beneficial to any application that uses multiple sets of data in subprocesses (e.g., the calculation of pricing components) that support an overall common process (e.g., the calculation of a net price using the pricing components).

The foregoing description of possible implementations and embodiments consistent with the present disclosure does not represent a comprehensive list of all such implementations or all variations of the implementations described. The description of only some implementations should not be construed as an intent to exclude other implementations. Other embodiments of the present disclosure will be apparent to those skilled in the art from consideration of the specification and practice of the present disclosure disclosed herein. One of ordinary skill in the art will understand how to implement the disclosed embodiments in the appended claims in other ways using equivalents and alternatives that do not depart from the scope of the following claims. It is intended that the specification and examples be considered as exemplary only, with a true scope and spirit of the disclosed embodiments being indicated by the following claims.

What is claimed is:

1. A non-transitory computer-readable medium storing a set of instructions which, when executed by at least one processor in communication with a database, cause the at least one processor to perform operations for establishing and enforcing approval thresholds, the operations comprising:

receiving, by the at least one processor from the database, approval threshold data from a plurality of threshold grids including attributes that define an approval threshold, wherein the approval threshold data represents one or more user levels in a grid form, wherein the one or more user levels correspond to permissions of a user and include a first user level and a second user level, the second user level having a corresponding approval threshold greater than that of the first user level;

generating, by the at least one processor, a rule set based on the approval threshold data;

pre-caching a result for the attribute by storing the rule set in a version history;

creating, by accessing data in the database, one or more information grids comprising a plurality of cells, wherein each cell contains a value representing data from the plurality of threshold grids and has a location in the one or more information grids;

determining the presence of an update to the one or more information grids;

based on the determination, creating, with the at least one processor, a computer model to represent the rule set, the model comprising:
- a flat grid structure comprising a plurality of fields storing the values and data representing a relationship to values in one or more other information grids, and
- a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure, associating, using the at least one processor, a common computer interface with the model;

receiving, by the common computer interface, a request for a change to update an element of the common computer interface;

making a first determination, with the at least one processor, whether the requested change is within the approval threshold by evaluating the rule set and whether there is a change to the rule set in the version history;

making a second determination, with the at least one processor, whether the requested change has been made at the second user level or reviewed by the second user level;

responsive to the first determination that the requested change is allowed by the rule set and the second determination that the requested change is allowed by the second user level, retrieving the pre-cached result and updating common computer interface by updating the element; and providing the updated common computer interface.

2. The non-transitory computer-readable medium of claim 1, wherein the element is a price associated with a mortgage asset.

3. The non-transitory computer-readable medium of claim 1, wherein the approval threshold data includes a user level.

4. The non-transitory computer-readable medium of claim 1, wherein the approval threshold data includes an eligibility associated with an entity.

5. The non-transitory computer-readable medium of claim 1, wherein determining whether the requested change is within an approval threshold includes determining whether the requested change within a second approval threshold.

6. A non-transitory computer-readable medium storing a set of instructions which, when executed by at least one processor in communication with a database, cause the at least one processor to perform operations for establishing and enforcing an eligibility rule set, the operations comprising:

receiving, by the at least one processor from the database, eligibility data from a plurality of grids including attributes that define at least one eligibility rule set, wherein the attribute represents one or more user levels in a grid form, wherein the one or more user levels correspond to permissions of a user and include a first user level and a second user level, the second user level having a corresponding approval threshold greater than that of the first user level;

pre-caching a result for the attribute by storing the eligibility rule set in a version history;

determining the presence of an update to the one or more information rids;

based on the determination, creating, by accessing data in the database, one or more information grids comprising a plurality of cells, wherein each cell contains a value representing data from the plurality of grids and has a location in the one or more information grids;

creating, with the at least one processor, a computer model to represent the eligibility rule set, the model comprising:
- a flat grid structure comprising a plurality of fields storing the values and data representing a relationship to values in one or more other information grids, and
- a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure, associating, using the at least one processor, a common computer interface with the model;

receiving, by the common computer interface, an attribute;

making a first determination, with the at least one processor, to allow one or more elements of the common computer interface associated with the attribute by evaluating the eligibility rule set and whether there is a change to the eligibility rule set in the version history;

making a second determination, with the at least one processor, whether the one or more elements of the common computer interface associated with the attribute has been made at the second user level or reviewed by the second user level;

responsive to the first determination that the elements are allowed by the eligibility rule set and the second determination that the elements are allowed by the second user level, retrieving the pre-cached result and updating the common computer interface to display the one or more elements determined by the eligibility rule set; and providing the updated common computer interface.

7. The non-transitory computer-readable medium of claim 6, wherein the one or more elements is a requires data input.

8. The non-transitory computer-readable medium of claim 6, wherein the eligibility data includes a time parameter.

9. The non-transitory computer-readable medium of claim 6, wherein the eligibility data includes layers of dependent eligibility data.

10. The non-transitory computer-readable medium of claim 6, wherein the one or more elements determined by the eligibility rule set includes a product type.

11. A non-transitory computer-readable medium storing a set of instructions which, when executed by at least one processor in communication with a database, cause the at least one processor to perform operations for establishing and enforcing volume limits, the operations comprising:
  receiving, by the at least one processor from the database, volume limit data from a plurality of grids including attributes that define a volume limit threshold, wherein the volume limit data represents transaction limits in a grid form;
  generating, by the at least one processor, a rule set based on the volume limit;
  pre-caching a result for the attribute by storing the rule set in a version history;
  creating, by accessing data in the database, one or more information grids comprising a plurality of cells, wherein each cell contains a value representing data from the plurality of grids and has a location in the one or more information grids;
  determining the presence of an update to the one or more information rids;
  based on the determination, creating, with the at least one processor, a computer model to represent the rule set, the model comprising:
    a flat grid structure comprising a plurality of fields storing the values and data representing a relationship to values in one or more other information grids, and
    a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure,
  associating, using the at least one processor, a computer interface with the model;
  receiving, by the computer interface, a request for a transaction;
  enforcing the volume limit by changing a display of the computer interface by:
    updating a pricing term within the computer interface or removing an access to further transactions;
  determining, with the at least one processor, whether the requested transaction is within the volume limit by:
    evaluating the rule set and comparing a running count of transactions to the volume limit; and
    determining whether there is a change to the rule set in the version history;
  responsive to a determination that the requested transaction is allowed by the rule set and the running count of transactions is less than the volume limit, processing the transaction and;
  retrieving the pre-cached result.

12. The non-transitory computer-readable medium of claim 11, wherein the requested transaction is a cash transaction.

13. The non-transitory computer-readable medium of claim 11, wherein the volume limit data includes a time parameter.

14. The non-transitory computer-readable medium of claim 11, wherein the volume limit data includes secondary pricing terms.

15. The non-transitory computer-readable medium of claim 11, wherein the eligibility data includes a maximum dollar amount and a period of time.

16. A non-transitory computer-readable medium storing a set of instructions which, when executed by at least one processor in communication with a database, cause the at least one processor to perform operations for establishing and enforcing global resources, the operations comprising:
  receiving, by the at least one processor from in the database, global resource data from a plurality of grids including attributes that define a global resource rule set, wherein the global resource data represents system behavior in a grid form, wherein the global resource rule set applies to a transaction based on one or more user levels; wherein the one or more user levels correspond to permission of a user and include a first user level and a second user level, the second user level having a corresponding approval threshold greater than that of the first user level;
  pre-caching a result for the attribute by storing the global resource rule set in a version history;
  creating, by accessing data in the database, one or more information grids comprising a plurality of cells, wherein each cell contains a value representing data from the plurality of grids and has a location in the one or more information grids;
  determining the presence of an update to the one or more information rids;
  based on the determination, creating, with the at least one processor, a computer model to represent the global resource rule set, the model comprising:
    a flat grid structure comprising a plurality of fields storing the values and data representing a relationship to values in one or more other information grids, and
    a tree node structure comprising a plurality of tree nodes storing the values, a grid definition identifying the one or more information grids, a grid node storing the value of at least one of the plurality of cells and containing a reference to a parent node, and a grid schema specifying a location of the grid node in the tree structure,
  associating, using the at least one processor, a computer interface with the model;
  receiving, by the computer interface, a request for a transaction;
  making a first determination, with the at least one processor, whether the global resource rule set applies to the requested transaction based on the user levels and whether there is a change to the global resource rule set in the version history;
  making a second determination, with the at least one processor, whether the global resource rule set has been made at the second user level or reviewed by the second user level; and
  responsive to the first determination that the that the global resource rule set applies to the requested transaction based on the user levels and the second determination that the global resource rule set has been allowed by the second user level, accessing the model to retrieve global resource data and retrieving the pre-cached result.

17. The non-transitory computer-readable medium of claim 16, wherein the global resource rule set applies to all transactions.

18. The non-transitory computer-readable medium of claim 16, wherein the global resource rule set applies to transactions by all user levels.

19. The non-transitory computer-readable medium of claim 16, wherein the global resource rule set applies to transactions by a subset of user levels.

20. The non-transitory computer-readable medium of claim 16, wherein the database is cloud-based.

\* \* \* \* \*